US012658806B2

(12) United States Patent
Fang et al.

(10) Patent No.: US 12,658,806 B2
(45) Date of Patent: Jun. 16, 2026

(54) SWITCH-MODE POWER CONVERTERS WITH DEMAGNETIZATION DETECTION AND METHODS THEREOF

(71) Applicant: ON-BRIGHT ELECTRONICS (SHANGHAI) CO., LTD., Shanghai (CN)

(72) Inventors: Qian Fang, Shanghai (CN); Yun Sun, Shanghai (CN); Tuofu Liu, Shanghai (CN); Xiuhong Zhang, Shanghai (CN); Yuan Lin, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 98 days.

(21) Appl. No.: 18/605,047

(22) Filed: Mar. 14, 2024

(65) Prior Publication Data

US 2024/0322695 A1 Sep. 26, 2024

(30) Foreign Application Priority Data

Mar. 14, 2023 (CN) .......................... 202310245305.8
Mar. 14, 2023 (CN) .......................... 202310246278.6

(51) Int. Cl.
*H02M 3/335* (2006.01)
*H02M 1/00* (2006.01)
*H02M 1/38* (2007.01)

(52) U.S. Cl.
CPC ..... *H02M 3/33523* (2013.01); *H02M 1/0009* (2021.05); *H02M 1/0025* (2021.05);
(Continued)

(58) Field of Classification Search
CPC ........... H02M 3/33523; H02M 1/0009; H02M 1/0025; H02M 1/0058; H02M 1/385; H02M 3/33515
See application file for complete search history.

(56) References Cited

U.S. PATENT DOCUMENTS 6,385,059 B1 5/2002 Telefus et al.
9,674,903 B2 6/2017 Moon et al.
(Continued)

FOREIGN PATENT DOCUMENTS

CN 101895201 A 11/2010
CN 102684503 A 9/2012
(Continued)

OTHER PUBLICATIONS

Taiwan Patent Office, Office Action mailed Nov. 10, 2023, in Application No. 112117187.
(Continued)

*Primary Examiner* — Thienvu V Tran
*Assistant Examiner* — Afework S Demisse
(74) *Attorney, Agent, or Firm* — Faegre Drinker Biddle & Reath LLP

(57) ABSTRACT

Controller and method for a power converter. For example, a controller for a power converter includes: a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time; a second drive signal generator configured to generate a second drive signal to turn on a second transistor at a third time, the second transistor being coupled to the first transistor and related to the primary winding, the third time being later than the first time and being earlier than the second time.

38 Claims, 11 Drawing Sheets

(52) U.S. Cl.
CPC ......... *H02M 1/0058* (2021.05); *H02M 1/385* (2021.05); *H02M 3/33515* (2013.01)

(56) References Cited

U.S. PATENT DOCUMENTS

| | | | |
|---|---|---|---|
| 9,787,198 B1 | 10/2017 | Cao et al. | |
| 10,063,153 B2 | 8/2018 | Fang | |
| 10,103,616 B1* | 10/2018 | Lin ....................... | H02M 1/083 |
| 10,277,131 B2 | 4/2019 | Zhang et al. | |
| 11,205,950 B2 | 12/2021 | Lau et al. | |
| 11,451,155 B2 | 9/2022 | Ng et al. | |
| 12,301,117 B2 | 5/2025 | Yang et al. | |
| 12,348,150 B2 | 7/2025 | Yang et al. | |
| 12,362,650 B2 | 7/2025 | Fang et al. | |
| 2010/0067259 A1 | 3/2010 | Liu | |
| 2014/0016376 A1 | 1/2014 | Gao et al. | |
| 2014/0133192 A1 | 5/2014 | Lin et al. | |
| 2014/0140109 A1 | 5/2014 | Valley | |
| 2019/0222131 A1 | 7/2019 | King | |
| 2020/0112241 A1 | 4/2020 | Wang et al. | |
| 2021/0006147 A1 | 1/2021 | Feldtkeller | |
| 2022/0037985 A1* | 2/2022 | Ng ........................... | H02M 3/01 |
| 2023/0099279 A1* | 3/2023 | Fang ................. | H02M 3/33507 |
| | | | 363/21.13 |
| 2023/0188046 A1 | 6/2023 | Chen | |
| 2023/0283165 A1 | 9/2023 | Fang et al. | |
| 2023/0291315 A1 | 9/2023 | Yang et al. | |
| 2023/0327570 A1 | 10/2023 | Yang et al. | |
| 2024/0204674 A1* | 6/2024 | Jiang ................. | H02M 3/33571 |
| 2024/0275275 A1 | 8/2024 | Yang et al. | |
| 2024/0313657 A1 | 9/2024 | Fang et al. | |
| 2025/0350208 A1 | 11/2025 | Yang et al. | |

FOREIGN PATENT DOCUMENTS

| | | | |
|---|---|---|---|
| CN | 103066855 A | 4/2013 | |
| CN | 103280963 A | 9/2013 | |
| CN | 103944374 A | 7/2014 | |
| CN | 104218806 A | 12/2014 | |
| CN | 106533214 A | 3/2017 | |
| CN | 107426874 A | 12/2017 | |
| CN | 107872158 A | 4/2018 | |
| CN | 108809107 A | 11/2018 | |
| CN | 211237683 U | 8/2020 | |
| CN | 112510976 A | 3/2021 | |
| CN | 112838772 A | 5/2021 | |
| CN | 112928924 A | 6/2021 | |
| CN | 113193758 A | 7/2021 | |
| CN | 113708631 A | 11/2021 | |
| CN | 113765407 A | 12/2021 | |
| CN | 113992018 A | 1/2022 | |
| CN | 115224951 A | 10/2022 | |
| CN | 115360918 A | 11/2022 | |
| CN | 115694145 A | 2/2023 | |
| JP | 2016-042765 A | 3/2016 | |
| TW | 201543797 A | 11/2015 | |
| TW | 201603444 A | 1/2016 | |
| TW | 201926877 A | 7/2019 | |
| TW | 202008703 A | 2/2020 | |
| TW | 202201891 A | 1/2022 | |
| TW | M623787 U | 2/2022 | |
| TW | 202230940 A | 8/2022 | |

OTHER PUBLICATIONS

Taiwan Patent Office, Office Action mailed Nov. 10, 2023, in Application No. 112117188.
Taiwan Patent Office, Office Action mailed Nov. 16, 2023, in Application No. 111123512.
Taiwan Patent Office, Office Action mailed Oct. 23, 2023, in Application No. 111122734.
Taiwan Patent Office, Office Action mailed Sep. 12, 2023, in Application No. 111126161.
United States Patent and Trademark Office, Notice of Allowance mailed Jan. 7, 2025, in U.S. Appl. No. 18/111,853.
United States Patent and Trademark Office, Notice of Allowance mailed Mar. 21, 2025, in U.S. Appl. No. 18/118,003.
United States Patent and Trademark Office, Notice of Allowance mailed Mar. 5, 2025, in U.S. Appl. No. 18/125,559.
Chinese Patent Office, Office Action mailed Jul. 22, 2025, in Application No. 202210102629.1.
Chinese Patent Office, Office Action mailed Jul. 24, 2025, in Application No. 202210225382.2.
Chinese Patent Office, Office Action mailed Aug. 6, 2025, in Application No. 202210289552.3.
United States Patent and Trademark Office, Office Action mailed Nov. 4, 2025, in U.S. Appl. No. 18/601,567.
United States Patent and Trademark Office, Office Action mailed Feb. 25, 2026, in U.S. Appl. No. 18/601,567.

* cited by examiner

SWITCH-MODE POWER CONVERTERS WITH DEMAGNETIZATION DETECTION AND METHODS THEREOF

1. CROSS-REFERENCES TO RELATED APPLICATIONS

This application claims priority to Chinese Patent Application No. 202310246278.6, filed Mar. 14, 2023, and Chinese Patent Application No. 202310245305.8, filed Mar. 14, 2023, both of these applications being incorporated by reference herein for all purposes.

U.S. patent application Ser. No. 18/601,567, filed Mar. 11, 2024, is incorporated by reference herein for all purposes.

2. FIELD OF THE DISCLOSURE

Certain embodiments of the present disclosure are directed to circuits. More particularly, some embodiments of the disclosure provide demagnetization detection. Merely by way of example, some embodiments of the disclosure have been applied to asymmetrical half-bridge fly back switch-mode power converters. But it would be recognized that the disclosure has a much broader range of applicability.

3. BACKGROUND OF THE DISCLOSURE

The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level. The power converters include linear converters and switch-mode converters. The switch-mode converters often are implemented with various architectures, such as the fly-back architecture, the buck architecture, and/or the boost architecture.

FIG. 1 is a simplified diagram showing a conventional asymmetrical half-bridge fly back switch-mode power converter. The asymmetrical half-bridge fly back switch-mode power converter 100 includes a primary winding 110, a secondary winding 112, transistors 120 and 130, a bridge rectifier 140, a diode 142, a resistor 144, and capacitors 150, 152 and 154. In some examples, each transistor of the transistors 120 and 130 is a metal-oxide-semiconductor field-effect transistor (MOSFET). For example, the transistor 120 includes a drain terminal 122, a gate terminal 124, and a source terminal 126, and the transistor 130 includes a drain terminal 132, a gate terminal 134, and a source terminal 136. As an example, the capacitor 152 includes capacitor terminals 156 and 158, and the diode 142 includes an anode 146 and a cathode 148.

As shown in FIG. 1, in an equivalent circuit, the primary winding 110 includes an inductor 116 with a primary inductance $L_p$, and the primary winding 110 also includes an inductor 118 with a leakage inductance $L_r$. For example, the sum of the leakage inductance $L_r$ and the primary inductance $L_p$ is represented by $L_m$. If a current 117 (e.g., $I_{Lm}$) flows from the capacitor terminal 158 to the primary winding 110, the current 117 has a positive value, and if the current 117 (e.g., $I_{Lm}$) flows from the primary winding 110 to the capacitor terminal 158, the current 117 has a negative value. The asymmetrical half-bridge flyback switch-mode power converter 100 receives an AC voltage 190 and generates an output voltage 192. The gate terminal 124 receives a drive voltage 125, and the gate terminal 134 receives a drive voltage 135. The source terminal 126 of the transistor 120 and the drain terminal 132 of the transistor 130 are connected to the capacitor terminal 156 (e.g., $C_r$) of the capacitor 152 and biased to a voltage 127 (e.g., HB). The voltage 127 (e.g., HB) is the source voltage of the transistor 120 and the drain voltage of the transistor 130. The capacitor terminal 158 is connected to the primary winding 110. If a current 153 (e.g., $I_{Lr}$) flows to the capacitor terminal 156, the current 153 has a positive value, and if the current 153 (e.g., $I_{Lr}$) flows from the capacitor terminal 156, the current 153 has a negative value. Additionally, the anode 146 is connected to the secondary winding 112. If a current 143 (e.g., $I_{Do}$) flows to the anode 146, the current 143 has a positive value, and if the current 143 (e.g., $I_{Do}$) flows from the anode 146, the current 143 has a negative value. Also, the drain terminal 122 of the transistor 120 receives a voltage 151, and the source terminal 136 of the transistor 130 is biased to a ground voltage (e.g., 0 volts).

The asymmetrical half-bridge fly back switch-mode power converter 100 operates in a critical conduction mode (CRM) under a heavy load condition, and the asymmetrical half-bridge fly back switch-mode power converter 100 operates in a discontinuous conduction mode (DCM) under a light load condition. For example, the asymmetrical half-bridge flyback switch-mode power converter 100 operates in a cyclical manner, wherein each cycle of the discontinuous conduction mode (DCM) is followed by M cycles of the critical conduction mode (CRM) before another cycle of the discontinuous conduction mode (DCM), wherein M is a constant positive integer. As an example, the asymmetrical half-bridge flyback switch-mode power converter 100 operates continuously in the discontinuous conduction mode (DCM).

In some examples, through the resonance of the capacitor 152 (e.g., $C_r$), an inductor 116 (e.g., with the primary inductance $L_p$), and the inductor 118 (e.g., with the leakage inductance $L_r$), the transistor 120 (e.g., $Q_1$) achieves low-voltage switching and/or zero-voltage switching. In certain examples, through the resonance of the capacitor 152 (e.g., $C_r$), the inductor 116 (e.g., with the primary inductance $L_p$), and the inductor 118 (e.g., with the leakage inductance $L_r$), the transistor 130 (e.g., $Q_2$) achieves low-voltage switching and/or zero-voltage switching.

FIG. 2 shows simplified timing diagrams for the conventional asymmetrical half-bridge fly back switch-mode power converter 100 as shown in FIG. 1 in the critical conduction mode (CRM). The waveform 225 represents the drive voltage 125 as a function of time, the waveform 235 represents the drive voltage 135 as a function of time, the waveform 217 represents the current 117 as a function of time, the waveform 253 represents the current 153 as a function of time, the waveform 243 represents the current 143 as a function of time, and the waveform 227 represents the voltage 127 as a function of time.

At time $t_0$, the drive voltage 125 changes from a logic low level to a logic high level as shown by the waveform 225, and the transistor 120 becomes turned on. From time $t_0$ to time $t_1$, the drive voltage 125 remains at the logic high level as shown by the waveform 225, and the transistor 120 remains turned on. For example, from time $t_0$ to time $t_1$, the current 153 increases with time, as shown by the waveform 253. As an example, during time $t_0$ and time $t_1$, after the current 153 becomes positive, the current 153 flows to the capacitor terminal 156, and the voltage 151 charges the primary winding 110 through the capacitor 152.

At time $t_1$, the drive voltage 125 changes from the logic high level to the logic low level as shown by the waveform 225, and the transistor 120 becomes turned off. For example, at time $t_1$, the voltage 151 stops charging the primary winding 110. As an example, at time $t_1$, the current 153 reaches a current value 254 (e.g., $I_p$), wherein the current value 254 is positive.

From time $t_1$ to time $t_2$, the current 153 (e.g., $I_{Lr}$) is used to charge the parasitic capacitor of the transistor 120 and discharge the parasitic capacitor of the transistor 130, and the voltage 127 decreases with time as shown by the waveform 227.

At time $t_2$, the drive voltage 135 changes from the logic low level to the logic high level as shown by the waveform 235, and the transistor 130 becomes turned on. For example, at time $t_2$, the voltage 127 decreases to zero volts. As an example, at time $t_2$, the transistor 130 becomes turned on with low-voltage switching and/or zero-voltage switching.

From time $t_2$ to time $t_3$, the drive voltage 135 remains at the logic high level as shown by the waveform 235, and the transistor 130 remains turned on. In some examples, from time $t_2$ to time $t_3$, the current 143 (e.g., $I_{Do}$) has a positive value as shown by the waveform 243. For example, from time $t_2$ to time $t_3$, through the resonance of the capacitor 152 and the inductor 118 (e.g., with the leakage inductance $L_r$), the current 153 (e.g., $I_{Lr}$) decreases to zero and then becomes negative as shown by the waveform 253. As an example, from time $t_2$ to time $t_3$, the current 117 (e.g., $I_{Lm}$) decreases linearly with time as shown by the waveform 217. At time $t_3$, the current 117 (e.g., $I_{Lm}$) becomes equal to the current 153 (e.g., $I_{Lr}$) as shown by the waveforms 217 and 253. As an example, at time $t_3$, the current 143 (e.g., $I_{Do}$) becomes equal to zero as shown by the waveform 243. From time $t_3$ to time $t_4$, the drive voltage 135 remains at the logic high level as shown by the waveform 235, and the transistor 130 remains turned on. For example, from time $t_3$ to time $t_4$, the capacitor 152 discharges through the transistor 130, and the current 153 flows from the capacitor terminal 156. As an example, from time $t_3$ to time $t_4$, the current 153 has a negative value that decreases with time as shown by the waveform 253.

At time $t_4$, the drive voltage 135 changes from the logic high level to the logic low level as shown by the waveform 235, and the transistor 130 becomes turned off. For example, at time $t_4$, the capacitor 152 stops discharging. As an example, at time $t_4$, the current 153 reaches a current value 255 (e.g., $I_n$), wherein the current value 255 is negative.

From time $t_4$ to time $t_5$, the current 153 (e.g., $I_{Lr}$) is used to discharge the parasitic capacitor of the transistor 120 and charge the parasitic capacitor of the transistor 130, and the voltage 127 increases with time as shown by the waveform 227. For example, from time $t_4$ to time $t_5$, the current 153 flows from the capacitor terminal 156. As an example, from time $t_4$ to time $t_5$, the current 153 has a negative value that increases with time as shown by the waveform 253.

At time $t_5$, the drive voltage 125 changes from the logic low level to the logic high level as shown by the waveform 225, and the transistor 120 becomes turned on. For example, at time $t_5$, the voltage 127 becomes equal to the voltage 151 as shown by the waveform 227. As an example, at time $t_5$, the transistor 120 becomes turned on with low-voltage switching and/or zero-voltage switching.

FIG. 3 shows simplified timing diagrams for the conventional asymmetrical half-bridge fly back switch-mode power converter 100 as shown in FIG. 1 in the discontinuous conduction mode (DCM). The waveform 425 represents the drive voltage 125 as a function of time, the waveform 435 represents the drive voltage 135 as a function of time, the waveform 417 represents the current 117 as a function of time, the waveform 453 represents the current 153 as a function of time, the waveform 443 represents the current 143 as a function of time, and the waveform 427 represents the voltage 127 as a function of time.

At time $t_{10}$, the drive voltage 125 changes from a logic low level to a logic high level as shown by the waveform 425, and the transistor 120 becomes turned on. From time $t_{10}$ to time $t_{11}$, the drive voltage 125 remains at the logic high level as shown by the waveform 425, and the transistor 120 remains turned on. For example, from time $t_{10}$ to time $t_{11}$, the current 153 increases with time, as shown by the waveform 453. As an example, during time $t_{10}$ and time $t_{11}$, after the current 153 becomes positive, the current 153 flows to the capacitor terminal 156, and the voltage 151 charges the primary winding 110 through the capacitor 152.

At time $t_{11}$, the drive voltage 125 changes from the logic high level to the logic low level as shown by the waveform 425, and the transistor 120 becomes turned off. For example, at time $t_{11}$, the voltage 151 stops charging the primary winding 110. As an example, at time $t_{11}$, the current 153 reaches a current value 454 (e.g., $I_p$), wherein the current value 454 is positive.

From time $t_{11}$ to time $t_{12}$, the current 153 (e.g., $I_{Lr}$) is used to charge the parasitic capacitor of the transistor 120 and discharge the parasitic capacitor of the transistor 130, and the voltage 127 decreases with time as shown by the waveform 427.

At time $t_{12}$, the drive voltage 135 changes from the logic low level to the logic high level as shown by the waveform 435, and the transistor 130 becomes turned on. For example, at time $t_{12}$, the voltage 127 decreases to zero volts. As an example, at time $t_{12}$, the transistor 130 becomes turned on with low-voltage switching and/or zero-voltage switching.

From time $t_{12}$ to time $t_{13}$, the drive voltage 135 remains at the logic high level as shown by the waveform 435, and the transistor 130 remains turned on. In some examples, from time $t_{12}$ to time $t_{13}$, the current 143 (e.g., $I_{Do}$) has a positive value as shown by the waveform 443. For example, from time $t_{12}$ to time $t_{13}$, through the resonance of the capacitor 152 and the inductor 118 (e.g., with the leakage inductance $L_r$), the current 153 (e.g., $I_{Lr}$) decreases to zero and then becomes negative as shown by the waveform 453. As an example, from time $t_{12}$ to time $t_{13}$, the current 117 (e.g., $I_{Lm}$) decreases linearly with time as shown by the waveform 417.

At time $t_{13}$, the drive voltage 135 changes from the logic high level to the logic low level as shown by the waveform 435, and the transistor 130 becomes turned off. The length of time duration from time $t_{12}$ to time $t_{13}$ is a predetermined constant for the asymmetrical half-bridge flyback switch-mode power converter 100 as shown in FIG. 1. The current 117 (e.g., $I_{Lm}$) at time $t_{13}$ depends at least in part on the predetermined constant that is used as the length of time duration from time $t_{12}$ to time $t_{13}$, and the current 117 (e.g., $I_{Lm}$) at time $t_{13}$ is either equal to zero or is not equal to zero as shown by the waveform 417.

From time $t_{13}$ to time $t_{14}$, the resonance of the parasitic capacitor of the transistor 120, the parasitic capacitor of the transistor 130, the inductor 116 (e.g., with the primary inductance $L_p$), and the inductor 118 (e.g., with the leakage inductance $L_r$) occurs. For example, through this resonance, the voltage 127 oscillates and reaches the voltage 151. As an example, through this resonance, the voltage 127 oscillates without reaching the voltage 151.

At time $t_{14}$, the drive voltage 135 changes from the logic low level to the logic high level as shown by the waveform 435, and the transistor 130 becomes turned on. From time $t_{14}$ to time $t_{15}$, the drive voltage 135 remains at the logic high level as shown by the waveform 435, and the transistor 130 remains turned on. In some examples, from time $t_{14}$ to time $t_{15}$, the capacitor 152 is discharged through the transistor 130, and the current 153 (e.g., $I_{Lr}$) flows from the capacitor terminal 156. In certain examples, from time $t_{14}$ to time $t_{15}$, the current 153 (e.g., $I_{Lr}$) has a negative value, and decreases with time as shown by the waveform 453.

At time $t_{15}$, the drive voltage 135 changes from the logic high level to the logic low level as shown by the waveform 435, and the transistor 130 becomes turned off. For example, at time $t_{15}$, the current 153 reaches a current value 455 (e.g., $I_{n\_ZVS}$), wherein the current value 455 is negative.

From time tis to time $t_{16}$, through the resonance of the parasitic capacitor of the transistor 120, the parasitic capacitor of the transistor 130, the inductor 116 (e.g., with the primary inductance $L_p$), and the inductor 118 (e.g., with the leakage inductance $L_r$), the current 153 (e.g., $I_{Lr}$) is used to discharge the parasitic capacitor of the transistor 120 and charge the parasitic capacitor of the transistor 130, and the voltage 127 increases with time as shown by the waveform 427.

At time $t_{16}$, the drive voltage 125 changes from the logic low level to the logic high level as shown by the waveform 425, and the transistor 120 becomes turned on. For example, at time $t_{16}$, the voltage 127 becomes equal to the voltage 151 as shown by the waveform 427. As an example, at time $t_{16}$, the transistor 120 becomes turned on with low-voltage switching and/or zero-voltage switching.

Hence it is highly desirable to improve the technique for switch-mode power converters.

4. BRIEF SUMMARY OF THE DISCLOSURE

Certain embodiments of the present disclosure are directed to circuits. More particularly, some embodiments of the disclosure provide demagnetization detection. Merely by way of example, some embodiments of the disclosure have been applied to asymmetrical half-bridge fly back switch-mode power converters. But it would be recognized that the disclosure has a much broader range of applicability.

According to certain embodiments, a controller for a power converter includes: a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time; a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage; wherein the demagnetization detector is further configured to: detect an end of a demagnetization process based at least in part on the first voltage and the second voltage; and in response to detecting the end of the demagnetization process, change the demagnetization signal from a first logic level to a second logic level; wherein the second drive signal generator is further configured to: in response to the demagnetization signal changing from the first logic level to the second logic level, change the second drive signal to turn off the second transistor at a fourth time, the fourth time being later than the third time and being earlier than the second time.

According to some embodiments, a controller for a power converter includes: a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time; a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage; wherein the demagnetization detector is further configured to: detect an end of a demagnetization process based at least in part on the first voltage and the second voltage; and in response to detecting the end of the demagnetization process, change the demagnetization signal from a first logic level to a second logic level at a fourth time, the fourth time being later than the third time and being earlier than the second time; wherein the second drive signal generator is further configured to: in response to the demagnetization signal changing from the first logic level to the second logic level at the fourth time, change the second drive signal to turn off the second transistor at a fifth time, the fifth time being later than the fourth time and being earlier than the second time.

According to certain embodiments, a method for a power converter includes: generating a first drive signal to turn off a first transistor at a first time, the first transistor being configured to receive an input voltage and related to a primary winding coupled to an auxiliary winding and a secondary winding, the secondary winding being related to an output voltage; changing the first drive signal to turn on the first transistor at a second time, the second time being later than the first time; generating a second drive signal to turn on a second transistor at a third time, the second transistor being coupled to the first transistor and related to the primary winding, the third time being later than the first time and being earlier than the second time; generating a demagnetization signal based at least in part on a first voltage and a second voltage, the first voltage being related to the auxiliary winding, the second voltage being related to the output voltage; and in response to the demagnetization signal changing from a first logic level to a second logic level, changing the second drive signal to turn off the second transistor at a fourth time, the fourth time being later than the third time and being earlier than the second time; wherein the generating a demagnetization signal based at least in part on a first voltage and a second voltage includes: detecting an end of a demagnetization process based at least in part on the first voltage and the second voltage; and in response to detecting the end of the demagnetization process, changing the demagnetization signal from the first logic level to the second logic level.

According to some embodiments, a method for a power converter includes: generating a first drive signal to turn off a first transistor at a first time, the first transistor being configured to receive an input voltage and related to a primary winding coupled to an auxiliary winding and a secondary winding, the secondary winding being related to an output voltage; changing the first drive signal to turn on the first transistor at a second time, the second time being later than the first time; generating a second drive signal to turn on a second transistor at a third time, the second transistor being coupled to the first transistor and related to the primary winding, the third time being later than the first time and being earlier than the second time; generating a demagnetization signal based at least in part on a first voltage and a second voltage, the first voltage being related to the auxiliary winding, the second voltage being related to the output voltage; and in response to the demagnetization signal changing from a first logic level to a second logic level at a fourth time, changing the second drive signal to turn off the second transistor at a fifth time, the fourth time being later than the third time and being earlier than the second time, the fifth time being later than the fourth time and being earlier than the second time; wherein the generating a demagnetization signal based at least in part on a first voltage and a second voltage includes: detecting an end of a demagnetization process based at least in part on the first voltage and the second voltage; and in response to detecting the end of the demagnetization process, changing the demagnetization signal from the first logic level to the second logic level at the fourth time. As an example, the first logic level is a logic low level; and the second logic level is a logic high level. For example, the generating a demagnetization signal based at least in part on a first voltage and a second voltage includes generating the demagnetization signal based at least in part on the first voltage, the second voltage and an adjustment signal. As an example, the generating the demagnetization signal based at least in part on the first voltage, the second voltage and an adjustment signal includes: detecting the end of the demagnetization process based at least in part on the first voltage, the second voltage and the adjustment signal; and in response to detecting the end of the demagnetization process, changing the demagnetization signal from the first logic level to the second logic level at the fourth time.

Depending upon embodiment, one or more benefits may be achieved. These benefits and various additional objects, features and advantages of the present disclosure can be fully appreciated with reference to the detailed description and accompanying drawings that follow.

5. BRIEF DESCRIPTION OF THE DRAWINGS

6. DETAILED DESCRIPTION OF THE DISCLOSURE

Certain embodiments of the present disclosure are directed to circuits. More particularly, some embodiments of the disclosure provide demagnetization detection. Merely by way of example, some embodiments of the disclosure have been applied to asymmetrical half-bridge fly back switch-mode power converters. But it would be recognized that the disclosure has a much broader range of applicability.

Figure 1:
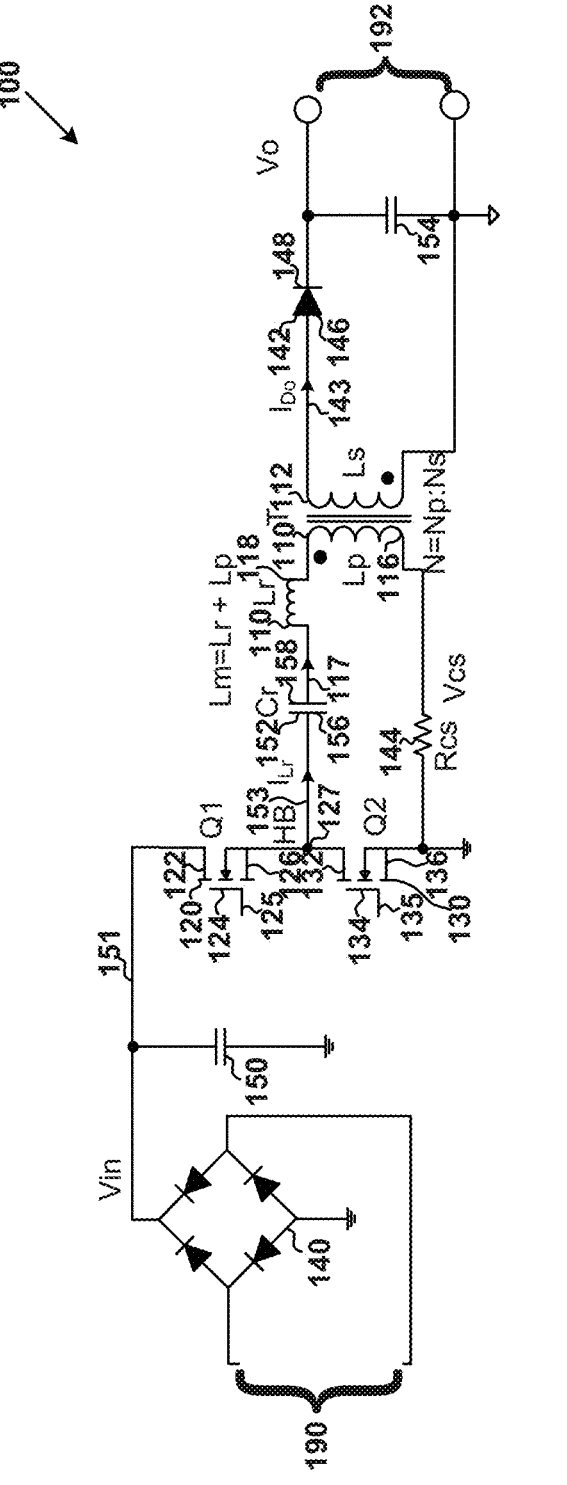
FIG. 1 is a simplified diagram showing a conventional asymmetrical half-bridge flyback switch-mode power converter.
Figure 2:
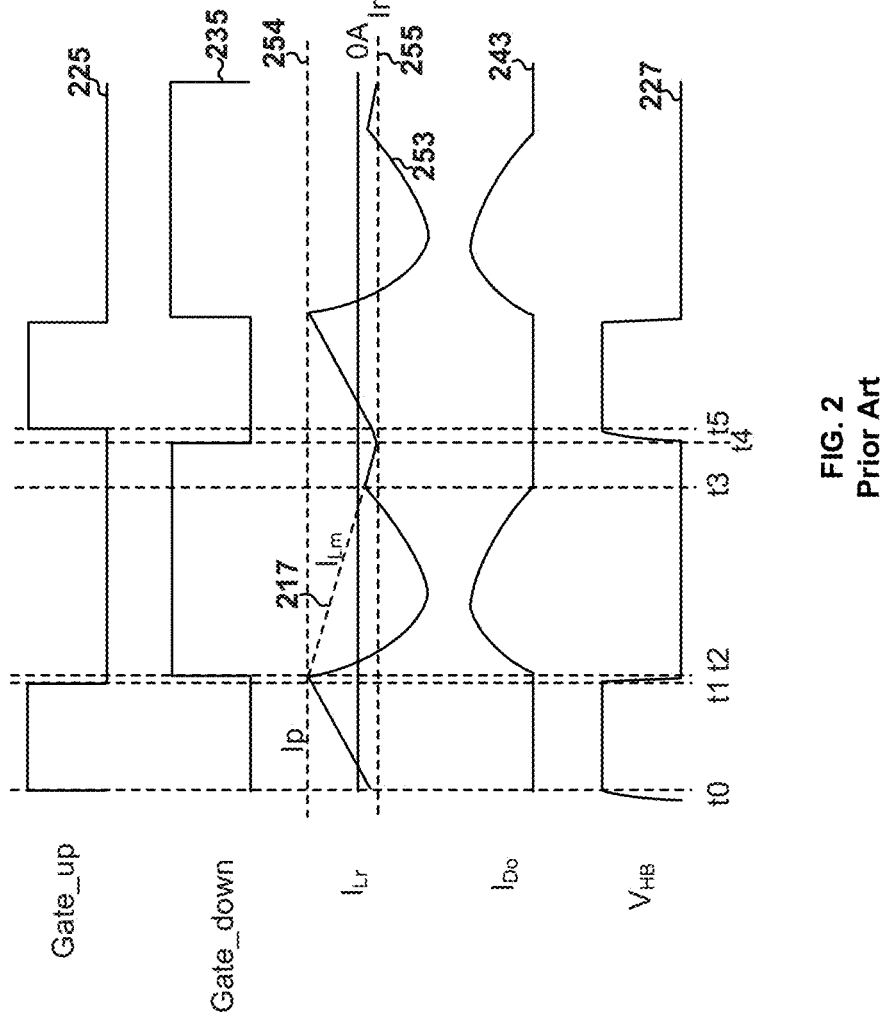
FIG. 2 shows simplified timing diagrams for the conventional asymmetrical half-bridge fly back switch-mode power converter as shown in FIG. 1 in the critical conduction mode (CRM).
Figure 3:
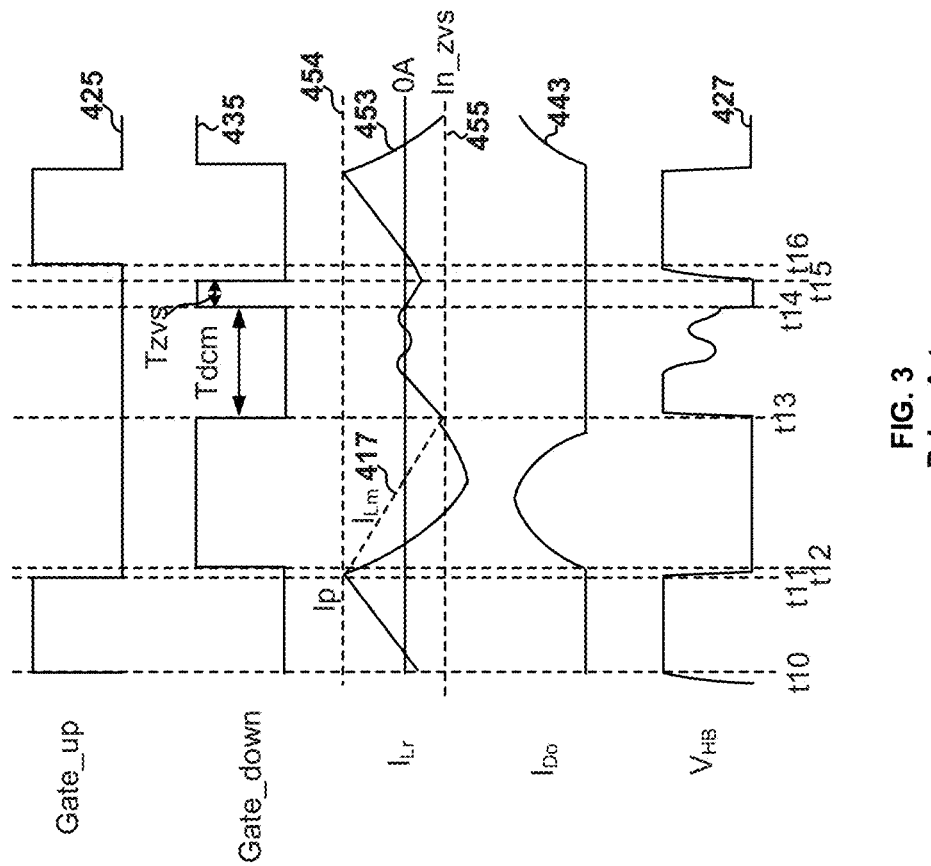
FIG. 3 shows simplified timing diagrams for the conventional asymmetrical half-bridge fly back switch-mode power converter as shown in FIG. 1 in the discontinuous conduction mode (DCM).
Figure 4A:
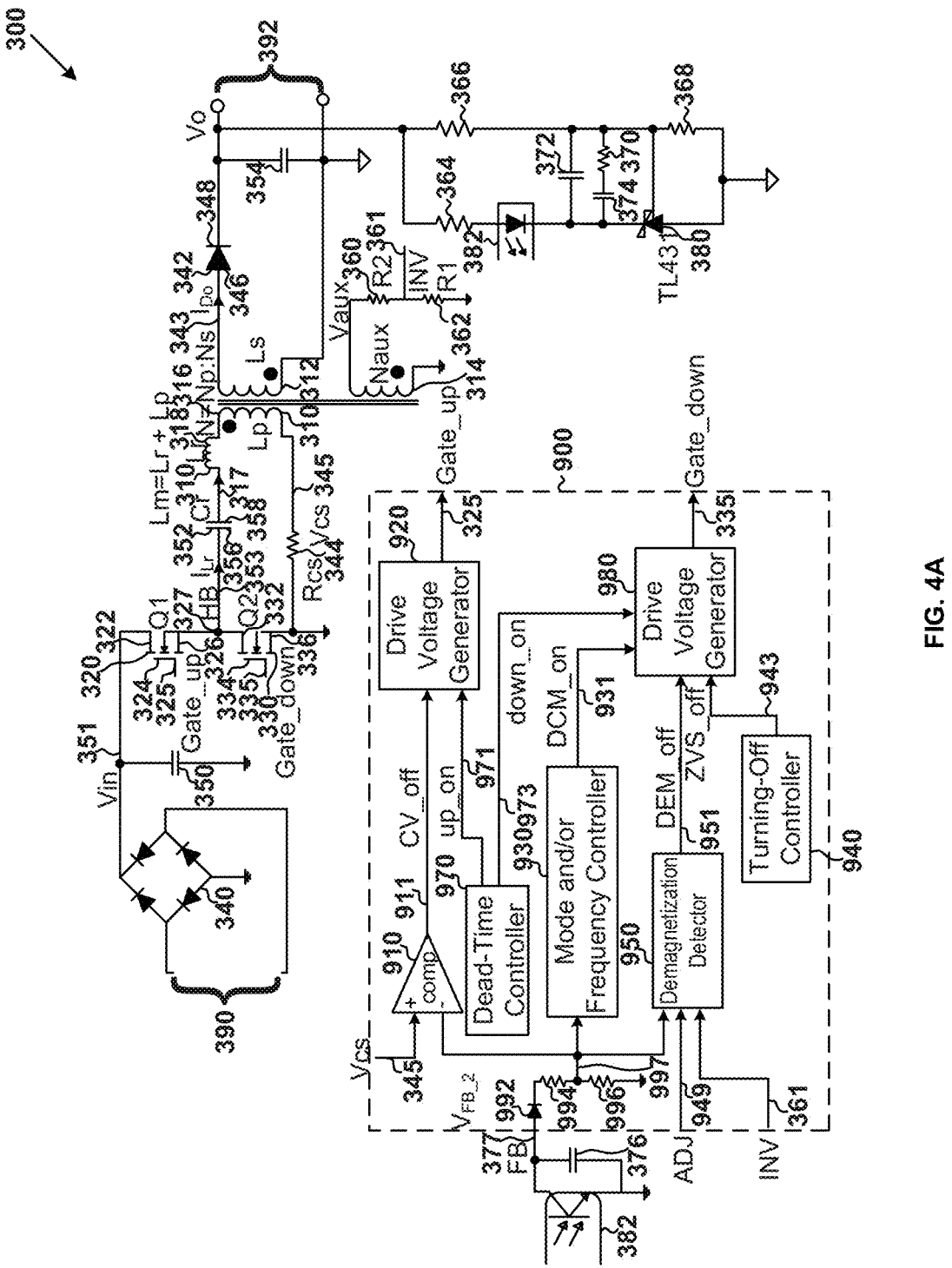
FIG. 4A is a simplified diagram showing an asymmetrical half-bridge fly back switch-mode power converter according to certain embodiments of the present disclosure.

FIG. 4A is a simplified diagram showing an asymmetrical half-bridge fly back switch-mode power converter according to certain embodiments of the present disclosure. This diagram is merely an example, which should not unduly limit the scope of the claims. One of ordinary skill in the art would recognize many variations, alternatives, and modifications. The asymmetrical half-bridge flyback switch-mode power converter 300 includes a primary winding 310, a secondary winding 312, an auxiliary winding 314, transistors 320 and 330, a bridge rectifier 340, a diode 342, a resistor 344, capacitors 350, 352 and 354, resistors 360, 362, 364, 366, 368 and 370, capacitors 372, 374 and 376, a shunt regulator 380 (e.g., TL431), an optocoupler 382, and a controller 900. The controller 900 includes a comparator 910, a drive voltage generator 920, a mode and/or frequency controller 930, a turning-off controller 940, a demagnetization detector 950, a dead-time controller 970, a drive voltage generator 980, a diode 992, and resistors 994 and 996. In some examples, each transistor of the transistors 320 and 330 is a metal-oxide-semiconductor field-effect transistor (MOSFET). For example, the transistor 320 includes a drain terminal 322, a gate terminal 324, and a source terminal 326, and the transistor 330 includes a drain terminal 332, a gate terminal 334, and a source terminal 336. As an example, the capacitor 352 (e.g., $C_r$) includes capacitor terminals 356 and 358, and the diode 342 includes an anode 346 and a cathode 348. In certain examples, the primary winding 310, the secondary winding 312, and the auxiliary winding 314 are coupled to each other as parts of a transformer. Although the above has been shown using a selected group of components for the asymmetrical half-bridge flyback switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 4A, in an equivalent circuit, the primary winding 310 includes an inductor 316 with a primary inductance $L_p$, and the primary winding 310 also includes an inductor 318 with a leakage inductance $L_r$ according to some embodiments. For example, if a current 317 (e.g., $I_{Lm}$) flows from the capacitor terminal 358 to the primary winding 310, the current 317 has a positive value. As an example, if the current 317 (e.g., $I_{Lm}$) flows from the primary winding 310 to the capacitor terminal 358, the current 317 has a negative value.

According to certain embodiments, the asymmetrical half-bridge flyback switch-mode power converter 300 receives an AC voltage 390 and generates an output voltage 392 according to some embodiments. For example, the gate terminal 324 receives a drive voltage 325 (e.g., a drive signal), and the gate terminal 334 receives a drive voltage 335 (e.g., a drive signal). As an example, the source terminal 326 of the transistor 320 and the drain terminal 332 of the transistor 330 are connected to the capacitor terminal 356 of the capacitor 352 and biased to a voltage 327. For example, the voltage 327 (e.g., HB) is the source voltage of the transistor 320 and the drain voltage of the transistor 330. In certain examples, the capacitor terminal 358 is connected to the primary winding 310. For example, if a current 353 flows to the capacitor terminal 356, the current 353 has a positive value, and if the current 353 flows from the capacitor terminal 356, the current 353 has a negative value. In some examples, the anode 346 is connected to the secondary winding 312. For example, if a current 343 flows to the anode 346, the current 343 has a positive value, and if the current 343 flows from the anode 346, the current 343 has a negative value. As an example, the drain terminal 322 of the transistor 320 receives a voltage 351 (e.g., an input voltage), and the source terminal 336 of the transistor 330 is biased to a ground voltage (e.g., 0 volts).

In some embodiments, the controller 900 receives a feedback voltage 377 and a current sensing voltage 345 and generate the drive voltage 325 based at least in part on the feedback voltage 377 and the current sensing voltage 345. For example, the drive voltage 325 is used to turn on and/or turn off the transistor 320. In certain examples, the feedback voltage 377 represents the output voltage 392, and the current sensing voltage 345 represents the current 353. In some examples, the drive voltage generator 920 (e.g., a drive signal generator) receives a turning-off control signal 911 (e.g., CV_off) and a turning-on control signal 971 (e.g., up_on) and generates the drive voltage 325 (e.g., a drive signal) based at least in part on the turning-off control signal 911 (e.g., CV_off) and the turning-on control signal 971 (e.g., up_on) to turn on and/or turn off the transistor 320. For example, in response to the turning-off control signal 911 (e.g., CV_off) changing from a logic low level to a logic high level, the drive voltage generator 920 changes the drive voltage 325 from a logic high level to a logic low level in order to turn off the transistor 320. As an example, in response to the turning-on control signal 971 (e.g., up_on) changing from a logic low level to a logic high level, the drive voltage generator 920 changes the drive voltage 325 from a logic low level to a logic high level in order to turn on the transistor 320.

In certain embodiments, the controller 900 also receives a voltage 361 and generates the drive voltage 335 based at least in part on the feedback voltage 377 and the voltage 361. As an example, the drive voltage 335 is used to turn on and/or turn off the transistor 330. In some examples, the voltage 361 represents a voltage 315 of the auxiliary winding 314. For example, one terminal of the resistor 360 and one terminal of the resistor 362 are connected to each other and are both biased to the voltage 361. As shown in FIG. 4A, the drive voltage generator 980 (e.g., a drive signal generator) receives a mode and/or frequency control signal 931 (e.g., DCM_on), a turning-off control signal 943 (e.g., ZVS_off), a demagnetization signal 951 (e.g., DEM_off), and a turning-on control signal 973 (e.g., down_on), and generates the drive signal 335 (e.g., a drive signal) based at least in part on the mode and/or frequency control signal 931 (e.g., DCM_on), the turning-off control signal 943 (e.g., ZVS_off), the demagnetization signal 951 (e.g., DEM_off), and the turning-on control signal 973 (e.g., down_on) to turn on and/or turn off the transistor 330 according to certain embodiments.

According to some embodiments, the resistors 364, 366, 368 and 370, the capacitors 372, 374 and 376, the shunt regulator 380 (e.g., TL431), and the optocoupler 382 are used to generate the feedback voltage 377 based at least in part on the output voltage 392. For example, the feedback voltage 377 represents the output voltage 392. In certain examples, based at least in part on the feedback voltage 377, the diode 992 and the resistors 994 and 996 generate a voltage 997. For example, the feedback voltage 377 is reduced by the forward bias voltage of the diode 992 and then by the voltage divider that includes the resistors 994 and 996 in order to obtain the voltage 997. As an example, the change of the voltage 997 with time represents a difference between the output voltage 392 and a target voltage, wherein the target voltage is a voltage value to which the output voltage 392 is regulated. In some examples, the voltage 997 is received by the comparator 910, which also receives the current sensing voltage 345. For example, the comparator 910 generates the turning-off control signal 911 (e.g., CV_off) based at least in part on the current sensing voltage 345 and the voltage 997, and outputs the turning-off control signal 911 (e.g., CV_off) to the drive voltage generator 920. As an example, if the current sensing voltage 345 becomes larger than the voltage 997, the turning-off control signal 911 (e.g., CV_off) changes from a logic low level to a logic high level. In certain examples, in response to the turning-off control signal 911 (e.g., CV_off) changing from the logic low level to the logic high level, the drive voltage generator 920 changes the drive voltage 325 from the logic high level to the logic low level in order to turn off the transistor 320.

In certain embodiments, the dead-time controller 970 detects the drive voltage 325 changes from the logic high level to the logic low level, and then after a first predetermined dead-time duration (e.g., a first predetermined delay), changes the turning-on control signal 973 (e.g., down_on) from a logic low level to a logic high level to change the drive voltage 335 from a logic low level to a logic high level. For example, the turning-on control signal 973 (e.g., down_on) is at the logic high level and/or at the logic low level. As an example, in response to the turning-on control signal 973 (e.g., down_on) changing from the logic low level to the logic high level, the drive voltage generator 980 changes the drive voltage 335 from the logic low level to the logic high level in order to turn on the transistor 330. In some examples, the transistor 330 is turned on by the drive signal 335 the first predetermined dead-time duration (e.g., a first predetermined delay) after the transistor 320 is turned off. For example, during the first predetermined dead-time duration (e.g., a first predetermined delay), both transistors 320 and 330 are turned off.

In some embodiments, the dead-time controller 970) also detects the drive voltage 335 changes from the logic high level to the logic low level, and then after a second predetermined dead-time duration (e.g., a second predetermined delay), changes the turning-on control signal 971 (e.g., up_on) from the logic low level to the logic high level to change the drive voltage 325 from the logic low level to the logic high level. For example, the turning-on control signal 971 (e.g., up_on) is at the logic high level and/or at the logic low level. As an example, in response to at least the turning-on control signal 971 (e.g., up_on) changing from the logic low level to the logic high level, the drive voltage generator 920 changes the drive voltage 325 from the logic low level to the logic high level in order to turn on the transistor 320. In some examples, the transistor 320 is turned on by the drive signal 325 the second predetermined dead-time duration (e.g., a second predetermined delay) after the transistor 330 is turned off. For example, during the second predetermined dead-time duration (e.g., a second predetermined delay), both transistors 320 and 330 are turned off. As an example, the first predetermined dead-time duration (e.g., a first predetermined delay) and the second predetermined dead-time duration (e.g., a second predetermined delay) are equal or are not equal in length.

According to certain embodiments, the demagnetization detector 950 generates the demagnetization signal 951 (e.g., DEM_off). In some examples, the demagnetization signal 951 (e.g., DEM_off) is at the logic high level and/or at the logic low level. For example, if the asymmetrical half-bridge flyback switch-mode power converter 300 operates in a critical conduction mode (CRM), in response to the demagnetization signal 951 (e.g., DEM_off) changing from the logic low level to the logic high level, the drive voltage generator 980 does not change the drive voltage 335 from the logic high level to the logic low level, and the transistor 330 remains being turned on. As an example, if the asymmetrical half-bridge fly back switch-mode power converter 300 operates in a discontinuous conduction mode (DCM), in response to the demagnetization signal 951 (e.g., DEM_off) changing from the logic low level to the logic high level, the drive voltage generator 980 changes the drive voltage 335 from the logic high level to the logic low level in order to turn off the transistor 330.

In some embodiments, the demagnetization detector 950 receives the voltage 361 (e.g., INV), the voltage 997 (e.g., $V_{FB\_2}$) and an adjustment signal 949 (e.g., ADJ), and generates the demagnetization signal 951 (e.g., DEM_off) based at least in part on the voltage 361 (e.g., INV), the voltage 997 (e.g., $V_{FB\_2}$) and the adjustment signal 949 (e.g., ADJ). For example, the demagnetization detector 950 receives the voltage 361 (e.g., INV), the voltage 997 (e.g., $V_{FB\_2}$) and the adjustment signal 949 (e.g., ADJ) to detect the end of a demagnetization process of the primary winding 310. As an example, at the end of the demagnetization process of the primary winding 310, the demagnetization detector 950 changes the demagnetization signal 951 (e.g., DEM_off) from the logic low level to the logic high level.

In certain embodiments, the mode and/or frequency controller 930 receives the voltage 997 and generates the mode and/or frequency control signal 931 (e.g., DCM_on) based at least in part on the voltage 997. In certain examples, the mode and/or frequency control signal 931 (e.g., DCM_on) is used to control the operation mode and/or the operation frequency of the asymmetrical half-bridge flyback switch-mode power converter 300. For example, the mode and/or frequency control signal 931 (e.g., DCM_on) is used to lower the operation frequency of the asymmetrical half-bridge fly back switch-mode power converter 300 if the load of the asymmetrical half-bridge flyback switch-mode power converter 300 becomes lighter. In some examples, the mode and/or frequency control signal 931 (e.g., DCM_on) is at the logic high level and/or at the logic low level.

According to certain embodiments, in response to the mode and/or frequency control signal 931 (e.g., DCM_on) changing from the logic low level to the logic high level, the drive voltage generator 980 changes the drive voltage 335 from the logic low level to the logic high level in order to turn on the transistor 330.

According to some embodiments, the turning-off controller 940 generates the turning-off control signal 943 (e.g., ZVS_off). For example, the turning-off control signal 943 (e.g., ZVS_off) is at the logic high level and/or at the logic low level. As an example, in response to the turning-off control signal 943 (e.g., ZVS_off) changing from the logic low level to the logic high level, the drive voltage generator 980 changes the drive voltage 335 from the logic high level to the logic low level in order to turn off the transistor 330. In certain examples, the turning-off controller 940 receives the voltage 361 and generates the turning-off control signal 943 (e.g., ZVS_off) based at least in part on the voltage 361. In some examples, the turning-off controller 940 receives the demagnetization signal 951 (e.g., DEMP_off) and the mode and/or frequency control signal 931 (e.g., DCM_on) and generates the turning-off control signal 943 (e.g., ZVS_off) based at least in part on the demagnetization signal 951 (e.g., DEMP_off) and the mode and/or frequency control signal 931 (e.g., DCM_on). For example, if the asymmetrical half-bridge flyback switch-mode power converter 300 operates in a critical conduction mode (CRM), a first predetermined length of time (e.g., $T_{ZVS\_C}$) after the demagnetization signal 951 (e.g., DEMP_off) changes from the logic low level to the logic high level, the turning-off controller 940 changes the turning-off control signal 943 (e.g., ZVS_off) from the logic high level to the logic low level. As an example, if the asymmetrical half-bridge flyback switch-mode power converter 300 operates in a discontinuous conduction mode (DCM), a second predetermined length of time (e.g., $T_{ZVS\_D}$) after the mode and/or frequency control signal 931 (e.g., DCM_on) changes from the logic low level to the logic high level, the turning-off controller 940 changes the turning-off control signal 943 (e.g., ZVS_off) from the logic high level to the logic low level.

In certain examples, after the transistor 330 becomes turned off in response to the turning-off control signal 943 (e.g., ZVS_off) changing from the logic low level to the logic high level, the current 353 (e.g., $I_{Lr}$) is used to discharge the parasitic capacitor of the transistor 320 and charge the parasitic capacitor of the transistor 330, and the voltage 327 increases with time. For example, the voltage 327 increases to become equal to the voltage 351. As an example, the second predetermined dead-time duration (e.g., a second predetermined delay) after the transistor 330 becomes turned off in response to the turning-off control signal 943 (e.g., ZVS_off) changing from the logic low level to the logic high level, with the voltage 327 equal to the voltage 351, the drive voltage 325 changes from the logic low level to the logic high level and the transistor 320 becomes turned on with low-voltage switching and/or zero-voltage switching.

In certain embodiments, after the transistor 330 becomes turned off, through the resonance of the parasitic capacitor of the transistor 320, the parasitic capacitor of the transistor 330, the inductor 316 (e.g., with the primary inductance $L_p$), and the inductor 318 (e.g., with the leakage inductance $L_r$), the voltage 327 oscillates. For example, the voltage 327 oscillates and reaches the voltage 351. As an example, the second predetermined dead-time duration (e.g., a second predetermined delay) after the drive voltage 335 changes from the logic high level to the logic low level, with the voltage 327 equal to the voltage 351, the drive voltage 325 changes from the logic low level to the logic high level and the transistor 320 becomes turned on with low-voltage switching and/or zero-voltage switching.

In some embodiments, after the transistor 330 becomes turned off, the resonance of the parasitic capacitor of the transistor 320, the parasitic capacitor of the transistor 330, the inductor 316 (e.g., with the primary inductance $L_p$), the inductor 318 (e.g., with the leakage inductance $L_r$), and the capacitor 352 (e.g., $C_r$) occurs. In certain examples, the capacitance of the capacitor 352 (e.g., $C_r$) is much larger than the sum of the capacitance of the parasitic capacitor of the transistor 320 and the capacitance of the parasitic capacitor of the transistor 330, and the voltage drop between the capacitor terminals 356 and 358 of the capacitor 352 (e.g., $C_r$) is equal to $N \times V_o$, wherein $V_o$ represents the output voltage 392, and N represents the turns ratio that is equal to the ratio of the number of turns in the primary winding 310 to the number of turns in the secondary winding 312. For example, through the resonance of the parasitic capacitor of the transistor 320, the parasitic capacitor of the transistor 330, the inductor 316 (e.g., with the primary inductance $L_p$), the inductor 318 (e.g., with the leakage inductance $L_r$), and the capacitor 352 (e.g., $C_r$), the voltage 327 oscillates with an average value of $N \times V_o$ and an amplitude of $N \times V_o$, wherein $V_o$ represents the output voltage 392, and N represents the turns ratio that is equal to the ratio of the number of turns in the primary winding 310 to the number of turns in the secondary winding 312. As an example, the maximum value of the voltage 327 is equal to $2 \times N \times V_o$, and the minimum value of the voltage 327 is equal to zero.

As shown in FIG. 4A, the dead-time controller 970 generates the turning-on control signal 971 (e.g., up_on) and the turning-on control signal 973 (e.g., down on) according to some embodiments. In certain examples, the turning-on control signal 971 (e.g., upon) is received by the drive voltage generator 920, and the turning-on control signal 973 (e.g., down_on) is received by the drive voltage generator 980. For example, in response to the turning-on control signal 971 (e.g., up_on) changing from the logic low level to the logic high level, the drive voltage generator 920 changes the drive voltage 325 from the logic low level to the logic high level in order to turn on the transistor 320. As an example, in response to the turning-on control signal 973 (e.g., down_on) changing from the logic low level to the logic high level, the drive voltage generator 980 changes the drive voltage 335 from the logic low level to the logic high level in order to turn on the transistor 330.

In certain embodiments, after the drive voltage 325 changes from the logic low level to the logic high level and the transistor 320 becomes turned on, the voltage 351 charges the primary winding 310 through the capacitor 352 and the current 353 flows to the capacitor terminal 356 with a positive value that increases with time. For example, when the positive value of the current 353 increases with time, the current sensing voltage 345 also increases with time. As an example, if the current sensing voltage 345 becomes larger than the voltage 997, the drive voltage 325 changes from the logic high level to the logic low level to turn off the transistor 320. In some examples, after the transistor 320 becomes turned off, the primary winding 310 is used to discharge the parasitic capacitor of the transistor 330 and charge the parasitic capacitor of the transistor 320, and the voltage 327 decreases with time. For example, the voltage 327 decreases to zero volts. As an example, the first predetermined dead-time duration (e.g., a first predetermined delay) after the transistor 320 becomes turned off, with the voltage 327 at zero volts, the drive voltage 335 changes from the logic low level to the logic high level and the transistor 330 becomes turned on with low-voltage switching and/or zero-voltage switching. In certain examples, the demagnetization detector 950 determines when to change the demagnetization signal 951 (e.g., DEM_off) from the logic low level to the logic high level.

Figure 4B:
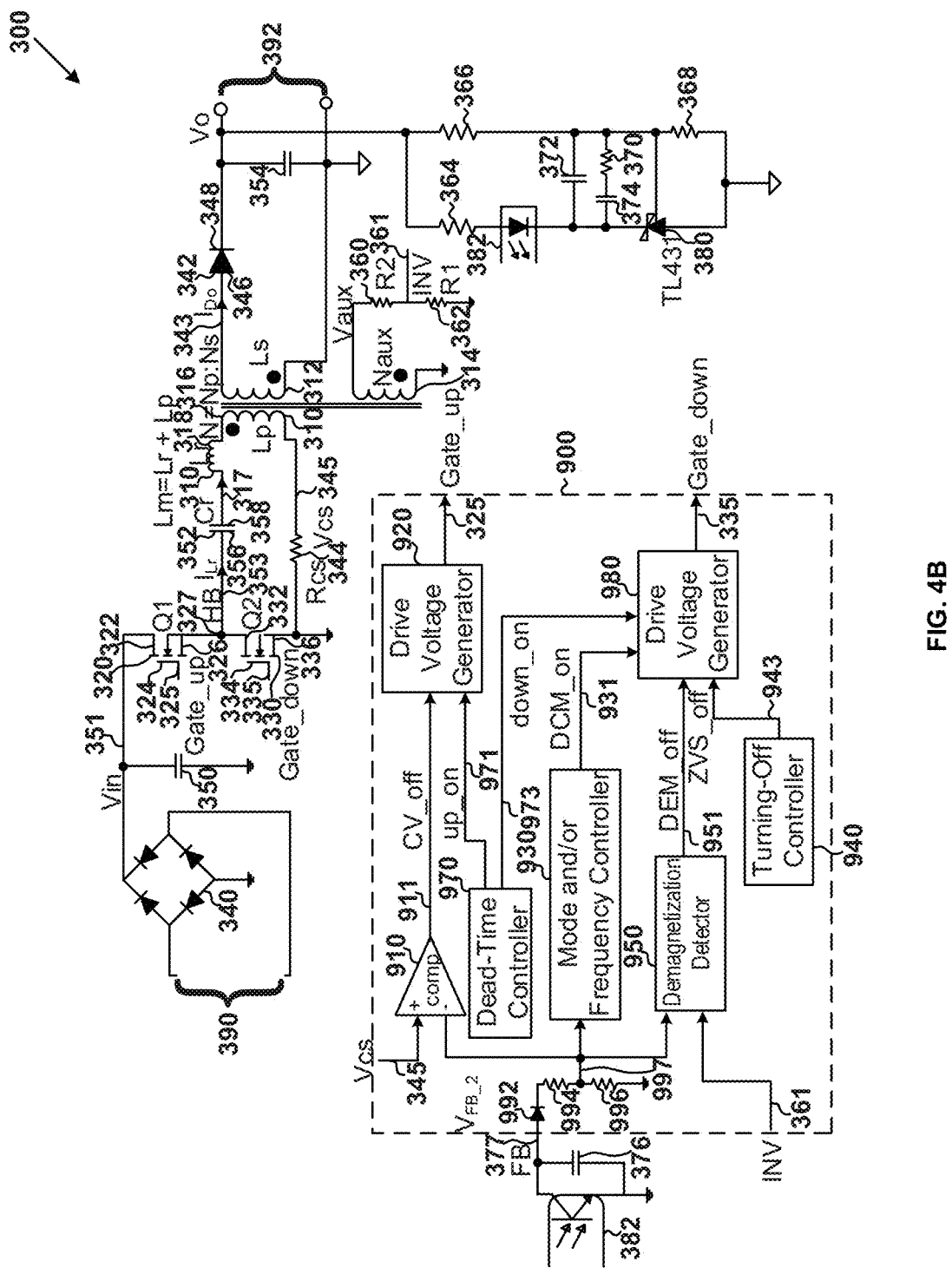
FIG. 4B is a simplified diagram showing an asymmetrical half-bridge flyback switch-mode power converter according to some embodiments of the present disclosure.

FIG. 4B is a simplified diagram showing an asymmetrical half-bridge flyback switch-mode power converter according to some embodiments of the present disclosure. This diagram is merely an example, which should not unduly limit the scope of the claims. One of ordinary skill in the art would recognize many variations, alternatives, and modifications. The asymmetrical half-bridge flyback switch-mode power converter 300 includes a primary winding 310, a secondary winding 312, an auxiliary winding 314, transistors 320 and 330, a bridge rectifier 340, a diode 342, a resistor 344, capacitors 350, 352 and 354, resistors 360, 362, 364, 366, 368 and 370, capacitors 372, 374 and 376, a shunt regulator 380 (e.g., TL431), an optocoupler 382, and a controller 900. The controller 900 includes a comparator 910, a drive voltage generator 920, a mode and/or frequency controller 930, a turning-off controller 940, a demagnetization detector 950, a dead-time controller 970, a drive voltage generator 980, a diode 992, and resistors 994 and 996. In some examples, each transistor of the transistors 320 and 330 is a metal-oxide-semiconductor field-effect transistor (MOS-FET). For example, the transistor 320 includes a drain terminal 322, a gate terminal 324, and a source terminal 326, and the transistor 330 includes a drain terminal 332, a gate terminal 334, and a source terminal 336. As an example, the capacitor 352 (e.g., $C_r$) includes capacitor terminals 356 and 358, and the diode 342 includes an anode 346 and a cathode 348. In certain examples, the primary winding 310, the secondary winding 312, and the auxiliary winding 314 are coupled to each other as parts of a transformer. Although the above has been shown using a selected group of components for the asymmetrical half-bridge flyback switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 4B, in an equivalent circuit, the primary winding 310 includes an inductor 316 with a primary inductance $L_p$, and the primary winding 310 also includes an inductor 318 with a leakage inductance $L_r$ according to some embodiments. For example, if a current 317 (e.g., $I_{Lm}$) flows from the capacitor terminal 358 to the primary winding 310, the current 317 has a positive value. As an example, if the current 317 (e.g., $I_{Lm}$) flows from the primary winding 310 to the capacitor terminal 358, the current 317 has a negative value.

According to certain embodiments, the asymmetrical half-bridge flyback switch-mode power converter 300 receives an AC voltage 390 and generates an output voltage 392 according to some embodiments. For example, the gate terminal 324 receives a drive voltage 325 (e.g., a drive signal), and the gate terminal 334 receives a drive voltage 335 (e.g., a drive signal). As an example, the source terminal 326 of the transistor 320 and the drain terminal 332 of the transistor 330 are connected to the capacitor terminal 356 of the capacitor 352 and biased to a voltage 327. For example, the voltage 327 (e.g., HB) is the source voltage of the transistor 320 and the drain voltage of the transistor 330. In certain examples, the capacitor terminal 358 is connected to the primary winding 310. For example, if a current 353 flows to the capacitor terminal 356, the current 353 has a positive value, and if the current 353 flows from the capacitor terminal 356, the current 353 has a negative value. In some examples, the anode 346 is connected to the secondary winding 312. For example, if a current 343 flows to the anode 346, the current 343 has a positive value, and if the current 343 flows from the anode 346, the current 343 has a negative value. As an example, the drain terminal 322 of the transistor 320 receives a voltage 351 (e.g., an input voltage), and the source terminal 336 of the transistor 330 is biased to a ground voltage (e.g., 0 volts).

In some embodiments, the controller 900 receives a feedback voltage 377 and a current sensing voltage 345 and generate the drive voltage 325 based at least in part on the feedback voltage 377 and the current sensing voltage 345. For example, the drive voltage 325 is used to turn on and/or turn off the transistor 320. In certain examples, the feedback voltage 377 represents the output voltage 392, and the current sensing voltage 345 represents the current 353. In some examples, the drive voltage generator 920 (e.g., a drive signal generator) receives a turning-off control signal 911 (e.g., CV_off) and a turning-on control signal 971 (e.g., up_on) and generates the drive voltage 325 (e.g., a drive signal) based at least in part on the turning-off control signal 911 (e.g., CV_off) and the turning-on control signal 971 (e.g., up_on) to turn on and/or turn off the transistor 320. For example, in response to the turning-off control signal 911 (e.g., CV_off) changing from a logic low level to a logic high level, the drive voltage generator 920 changes the drive voltage 325 from a logic high level to a logic low level in order to turn off the transistor 320. As an example, in response to the turning-on control signal 971 (e.g., up_on) changing from a logic low level to a logic high level, the drive voltage generator 920 changes the drive voltage 325 from a logic low level to a logic high level in order to turn on the transistor 320.

In certain embodiments, the controller 900 also receives a voltage 361 and generates the drive voltage 335 based at least in part on the feedback voltage 377 and the voltage 361. As an example, the drive voltage 335 is used to turn on and/or turn off the transistor 330. In some examples, the voltage 361 represents a voltage 315 of the auxiliary winding 314. For example, one terminal of the resistor 360 and one terminal of the resistor 362 are connected to each other and are both biased to the voltage 361. As shown in FIG. 4B, the drive voltage generator 980 (e.g., a drive signal generator) receives a mode and/or frequency control signal 931 (e.g., DCM_on), a turning-off control signal 943 (e.g., ZVS_off), a demagnetization signal 951 (e.g., DEM_off), and a turning-on control signal 973 (e.g., down_on), and generates the drive signal 335 (e.g., a drive signal) based at least in part on the mode and/or frequency control signal 931 (e.g., DCM_on), the turning-off control signal 943 (e.g., ZVS_off), the demagnetization signal 951 (e.g., DEM_off), and the turning-on control signal 973 (e.g., down_on) to turn on and/or turn off the transistor 330 according to certain embodiments.

According to some embodiments, the resistors 364, 366, 368 and 370, the capacitors 372, 374 and 376, the shunt regulator 380 (e.g., TL431), and the optocoupler 382 are used to generate the feedback voltage 377 based at least in part on the output voltage 392. For example, the feedback voltage 377 represents the output voltage 392. In certain examples, based at least in part on the feedback voltage 377, the diode 992 and the resistors 994 and 996 generate a voltage 997. For example, the feedback voltage 377 is reduced by the forward bias voltage of the diode 992 and then by the voltage divider that includes the resistors 994 and 996 in order to obtain the voltage 997. As an example, the change of the voltage 997 with time represents a difference between the output voltage 392 and a target voltage, wherein the target voltage is a voltage value to which the output voltage 392 is regulated. In some examples, the voltage 997 is received by the comparator 910, which also receives the current sensing voltage 345. For example, the comparator 910 generates the turning-off control signal 911 (e.g., CV_off) based at least in part on the current sensing voltage 345 and the voltage 997, and outputs the turning-off control signal 911 (e.g., CV_off) to the drive voltage generator 920. As an example, if the current sensing voltage 345 becomes larger than the voltage 997, the turning-off control signal 911 (e.g., CV_off) changes from a logic low level to a logic high level. In certain examples, in response to the turning-off control signal 911 (e.g., CV_off) changing from the logic low level to the logic high level, the drive voltage generator 920 changes the drive voltage 325 from the logic high level to the logic low level in order to turn off the transistor 320.

In certain embodiments, the dead-time controller 970 detects the drive voltage 325 changes from the logic high level to the logic low level, and then after a first predetermined dead-time duration (e.g., a first predetermined delay), changes the turning-on control signal 973 (e.g., down_on) from a logic low level to a logic high level to change the drive voltage 335 from a logic low level to a logic high level. For example, the turning-on control signal 973 (e.g., down_on) is at the logic high level and/or at the logic low level. As an example, in response to the turning-on control signal 973 (e.g., down_on) changing from the logic low level to the logic high level, the drive voltage generator 980 changes the drive voltage 335 from the logic low level to the logic high level in order to turn on the transistor 330. In some examples, the transistor 330 is turned on by the drive signal 335 the first predetermined dead-time duration (e.g., a first predetermined delay) after the transistor 320 is turned off. For example, during the first predetermined dead-time duration (e.g., a first predetermined delay), both transistors 320 and 330 are turned off.

In some embodiments, the dead-time controller 970) also detects the drive voltage 335 changes from the logic high level to the logic low level, and then after a second predetermined dead-time duration (e.g., a second predetermined delay), changes the turning-on control signal 971 (e.g., up_on) from the logic low level to the logic high level to change the drive voltage 325 from the logic low level to the logic high level. For example, the turning-on control signal 971 (e.g., up_on) is at the logic high level and/or at the logic low level. As an example, in response to at least the turning-on control signal 971 (e.g., up_on) changing from the logic low level to the logic high level, the drive voltage generator 920 changes the drive voltage 325 from the logic low level to the logic high level in order to turn on the transistor 320. In some examples, the transistor 320 is turned on by the drive signal 325 the second predetermined dead-time duration (e.g., a second predetermined delay) after the transistor 330 is turned off. For example, during the second predetermined dead-time duration (e.g., a second predetermined delay), both transistors 320 and 330 are turned off. As an example, the first predetermined dead-time duration (e.g., a first predetermined delay) and the second predetermined dead-time duration (e.g., a second predetermined delay) are equal or are not equal in length.

According to certain embodiments, the demagnetization detector 950 generates the demagnetization signal 951 (e.g., DEM_off). In some examples, the demagnetization signal 951 (e.g., DEM_off) is at the logic high level and/or at the logic low level. For example, if the asymmetrical half-bridge fly back switch-mode power converter 300 operates in a critical conduction mode (CRM), in response to the demagnetization signal 951 (e.g., DEM_off) changing from the logic low level to the logic high level, the drive voltage generator 980 does not change the drive voltage 335 from the logic high level to the logic low level, and the transistor 330 remains being turned on. As an example, if the asymmetrical half-bridge fly back switch-mode power converter 300 operates in a discontinuous conduction mode (DCM), in response to the demagnetization signal 951 (e.g., DEM_off) changing from the logic low level to the logic high level, the drive voltage generator 980 changes the drive voltage 335 from the logic high level to the logic low level in order to turn off the transistor 330.

In some embodiments, the demagnetization detector 950 receives the voltage 361 (e.g., INV) and the voltage 997 (e.g., $V_{FB\_2}$), and generates the demagnetization signal 951 (e.g., DEM_off) based at least in part on the voltage 361 (e.g., INV) and the voltage 997 (e.g., $V_{FB\_2}$). For example, the demagnetization detector 950 receives the voltage 361 (e.g., INV) and the voltage 997 (e.g., $V_{FB\_2}$) to detect the end of a demagnetization process of the primary winding 310. As an example, at the end of the demagnetization process of the primary winding 310, the demagnetization detector 950 changes the demagnetization signal 951 (e.g., DEM_off) from the logic low level to the logic high level.

In certain embodiments, the mode and/or frequency controller 930 receives the voltage 997 and generates the mode and/or frequency control signal 931 (e.g., DCM_on) based at least in part on the voltage 997. In certain examples, the mode and/or frequency control signal 931 (e.g., DCM_on) is used to control the operation mode and/or the operation frequency of the asymmetrical half-bridge flyback switch-mode power converter 300. For example, the mode and/or frequency control signal 931 (e.g., DCM_on) is used to lower the operation frequency of the asymmetrical half-bridge flyback switch-mode power converter 300 if the load of the asymmetrical half-bridge flyback switch-mode power converter 300 becomes lighter. In some examples, the mode and/or frequency control signal 931 (e.g., DCM_on) is at the logic high level and/or at the logic low level.

According to certain embodiments, in response to the mode and/or frequency control signal 931 (e.g., DCM_on) changing from the logic low level to the logic high level, the drive voltage generator 980 changes the drive voltage 335 from the logic low level to the logic high level in order to turn on the transistor 330.

According to some embodiments, the turning-off controller 940 generates the turning-off control signal 943 (e.g., ZVS_off). For example, the turning-off control signal 943 (e.g., ZVS_off) is at the logic high level and/or at the logic low level. As an example, in response to the turning-off control signal 943 (e.g., ZVS_off) changing from the logic low level to the logic high level, the drive voltage generator 980 changes the drive voltage 335 from the logic high level to the logic low level in order to turn off the transistor 330. In certain examples, the turning-off controller 940 receives the voltage 361 and generates the turning-off control signal 943 (e.g., ZVS_off) based at least in part on the voltage 361. In some examples, the turning-off controller 940 receives the demagnetization signal 951 (e.g., DEM_off) and the mode and/or frequency control signal 931 (e.g., DCM_on) and generates the turning-off control signal 943 (e.g., ZVS_off) based at least in part on the demagnetization signal 951 (e.g., DEM_off) and the mode and/or frequency control signal 931 (e.g., DCM_on). For example, if the asymmetrical half-bridge flyback switch-mode power converter 300 operates in a critical conduction mode (CRM), a first predetermined length of time (e.g., $T_{ZVS\_C}$) after the demagnetization signal 951 (e.g., DEM_off) changes from the logic low level to the logic high level, the turning-off controller 940 changes the turning-off control signal 943 (e.g., ZVS_off) from the logic high level to the logic low level. As an example, if the asymmetrical half-bridge fly back switch-mode power converter 300 operates in a discontinuous conduction mode (DCM), a second predetermined length of time (e.g., $T_{ZVS\_D}$) after the mode and/or frequency control signal 931 (e.g., DCM_on) changes from the logic low level to the logic high level, the turning-off controller 940 changes the turning-off control signal 943 (e.g., ZVS_off) from the logic high level to the logic low level.

In certain examples, after the transistor 330 becomes turned off in response to the turning-off control signal 943 (e.g., ZVS_off) changing from the logic low level to the logic high level, the current 353 (e.g., $I_{Lr}$) is used to discharge the parasitic capacitor of the transistor 320 and charge the parasitic capacitor of the transistor 330, and the voltage 327 increases with time. For example, the voltage 327 increases to become equal to the voltage 351. As an example, the second predetermined dead-time duration (e.g., a second predetermined delay) after the transistor 330 becomes turned off in response to the turning-off control signal 943 (e.g., ZVS_off) changing from the logic low level to the logic high level, with the voltage 327 equal to the voltage 351, the drive voltage 325 changes from the logic low level to the logic high level and the transistor 320 becomes turned on with low-voltage switching and/or zero-voltage switching.

In certain embodiments, after the transistor 330 becomes turned off, through the resonance of the parasitic capacitor of the transistor 320, the parasitic capacitor of the transistor 330, the inductor 316 (e.g., with the primary inductance $L_p$), and the inductor 318 (e.g., with the leakage inductance $L_r$), the voltage 327 oscillates. For example, the voltage 327 oscillates and reaches the voltage 351. As an example, the second predetermined dead-time duration (e.g., a second predetermined delay) after the drive voltage 335 changes from the logic high level to the logic low level, with the voltage 327 equal to the voltage 351, the drive voltage 325 changes from the logic low level to the logic high level and the transistor 320 becomes turned on with low-voltage switching and/or zero-voltage switching.

In some embodiments, after the transistor 330 becomes turned off, the resonance of the parasitic capacitor of the transistor 320, the parasitic capacitor of the transistor 330, the inductor 316 (e.g., with the primary inductance $L_p$), the inductor 318 (e.g., with the leakage inductance $L_r$), and the capacitor 352 (e.g., $C_r$) occurs. In certain examples, the capacitance of the capacitor 352 (e.g., $C_r$) is much larger than the sum of the capacitance of the parasitic capacitor of the transistor 320 and the capacitance of the parasitic capacitor of the transistor 330, and the voltage drop between the capacitor terminals 356 and 358 of the capacitor 352 (e.g., $C_r$) is equal to $N \times V_o$, wherein $V_o$ represents the output voltage 392, and N represents the turns ratio that is equal to the ratio of the number of turns in the primary winding 310 to the number of turns in the secondary winding 312.

For example, through the resonance of the parasitic capacitor of the transistor 320, the parasitic capacitor of the transistor 330, the inductor 316 (e.g., with the primary inductance $L_p$), the inductor 318 (e.g., with the leakage inductance $L_r$), and the capacitor 352 (e.g., $C_r$), the voltage 327 oscillates with an average value of $N \times V_o$ and an amplitude of $N \times V_o$, wherein $V_o$ represents the output voltage 392, and N represents the turns ratio that is equal to the ratio of the number of turns in the primary winding 310 to the number of turns in the secondary winding 312. As an example, the maximum value of the voltage 327 is equal to $2 \times N \times V_o$, and the minimum value of the voltage 327 is equal to zero.

As shown in FIG. 4B, the dead-time controller 970 generates the turning-on control signal 971 (e.g., up_on) and the turning-on control signal 973 (e.g., down_on) according to some embodiments. In certain examples, the turning-on control signal 971 (e.g., up_on) is received by the drive voltage generator 920, and the turning-on control signal 973 (e.g., down_on) is received by the drive voltage generator 980. For example, in response to the turning-on control signal 971 (e.g., up_on) changing from the logic low level to the logic high level, the drive voltage generator 920 changes the drive voltage 325 from the logic low level to the logic high level in order to turn on the transistor 320. As an example, in response to the turning-on control signal 973 (e.g., down_on) changing from the logic low level to the logic high level, the drive voltage generator 980 changes the drive voltage 335 from the logic low level to the logic high level in order to turn on the transistor 330.

In certain embodiments, after the drive voltage 325 changes from the logic low level to the logic high level and the transistor 320 becomes turned on, the voltage 351 charges the primary winding 310 through the capacitor 352 and the current 353 flows to the capacitor terminal 356 with a positive value that increases with time. For example, when the positive value of the current 353 increases with time, the current sensing voltage 345 also increases with time. As an example, if the current sensing voltage 345 becomes larger than the voltage 997, the drive voltage 325 changes from the logic high level to the logic low level to turn off the transistor 320. In some examples, after the transistor 320 becomes turned off, the primary winding 310 is used to discharge the parasitic capacitor of the transistor 330 and charge the parasitic capacitor of the transistor 320, and the voltage 327 decreases with time. For example, the voltage 327 decreases to zero volts. As an example, the first predetermined dead-time duration (e.g., a first predetermined delay) after the transistor 320 becomes turned off, with the voltage 327 at zero volts, the drive voltage 335 changes from the logic low level to the logic high level and the transistor 330 becomes turned on with low-voltage switching and/or zero-voltage switching. In certain examples, the demagnetization detector

950) determines when to change the demagnetization signal 951 (e.g., DEM_off) from the logic low level to the logic high level.

Figure 5:
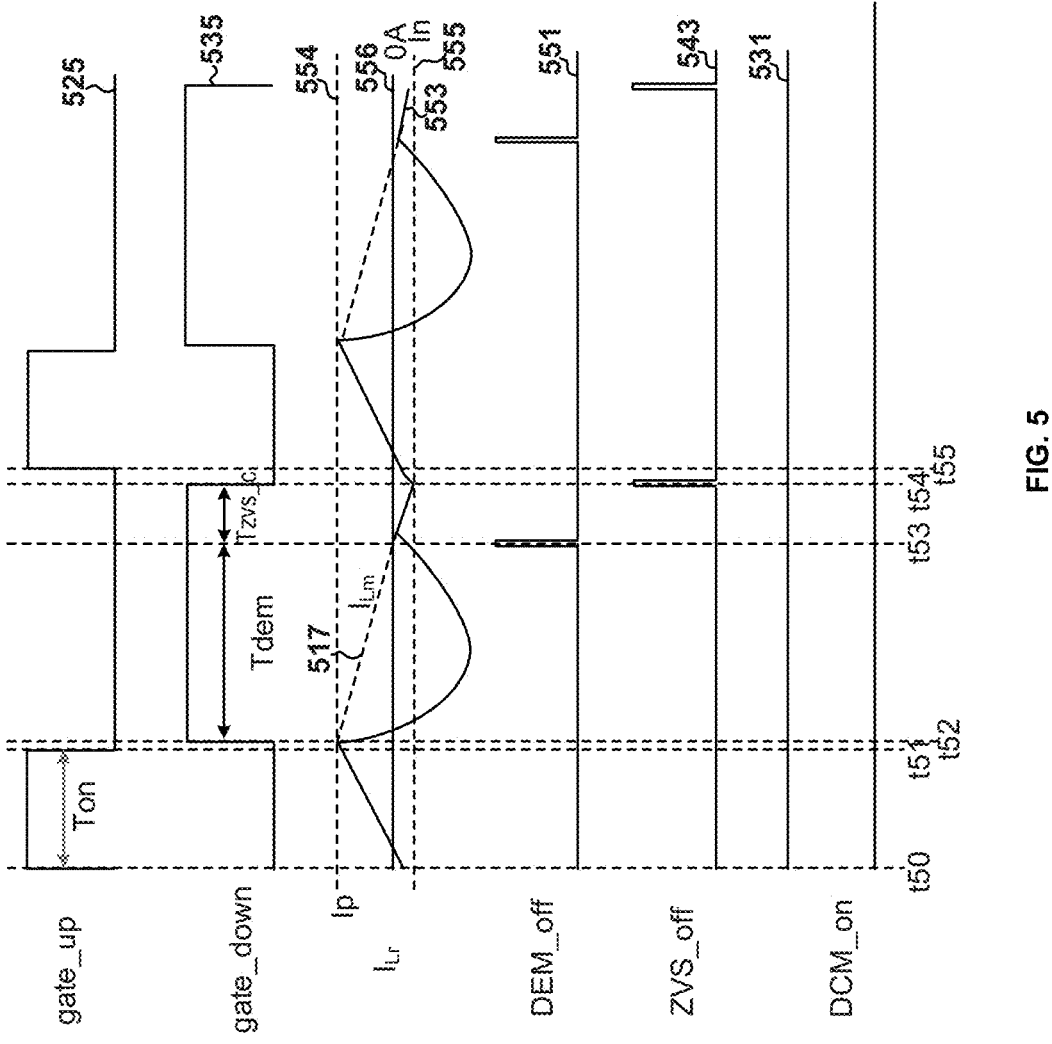
FIG. 5 shows simplified timing diagrams for the asymmetrical half-bridge fly back switch-mode power converter as shown in FIG. 4A and/or FIG. 4B in the critical conduction mode (CRM) according to certain embodiments of the present disclosure.
Figure 6:
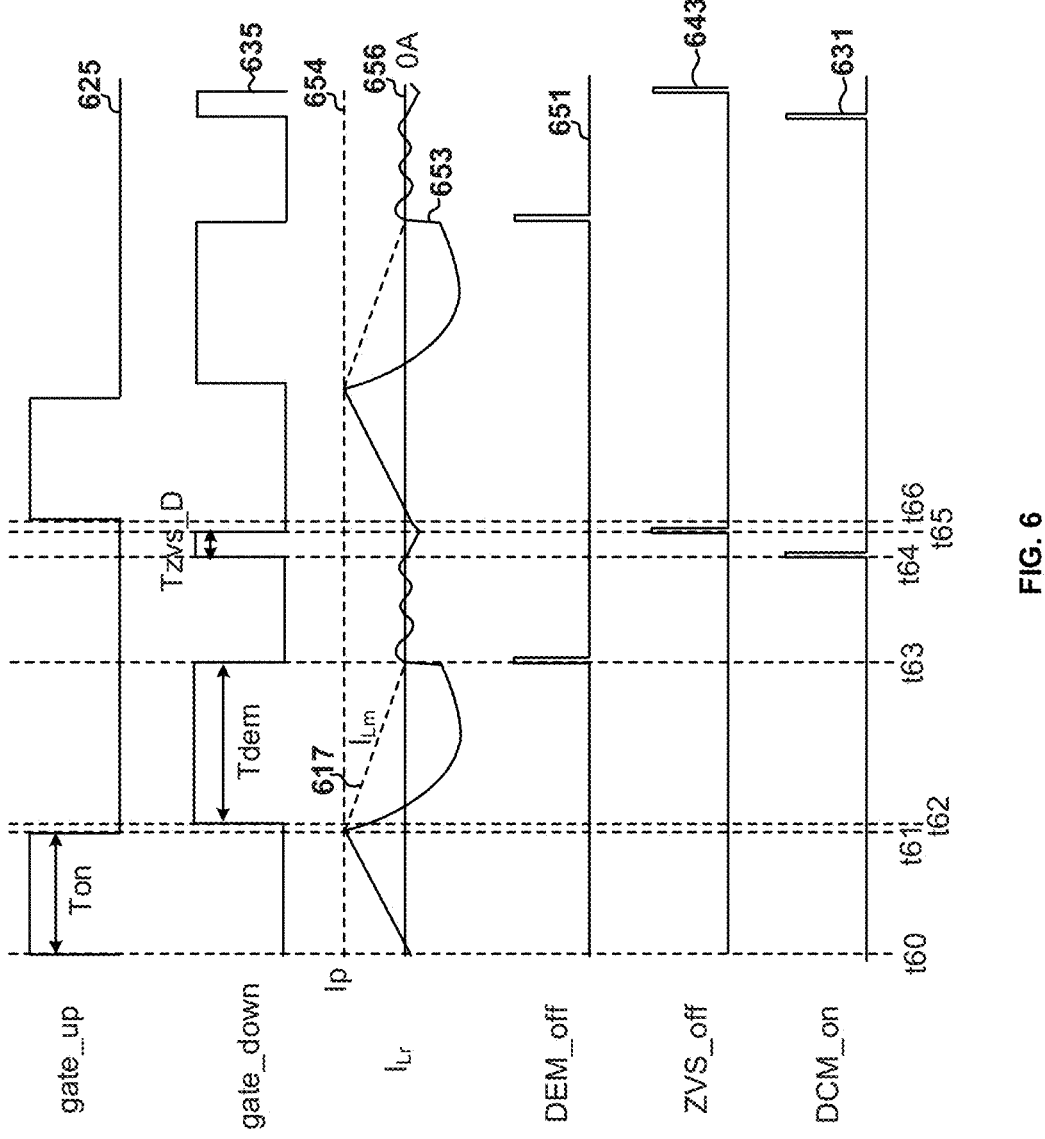
FIG. 6 shows simplified timing diagrams for the asymmetrical half-bridge flyback switch-mode power converter as shown in FIG. 4A and/or FIG. 4B in the discontinuous conduction mode (DCM) according to some embodiments of the present disclosure.

According to some embodiments, the asymmetrical half-bridge flyback switch-mode power converter 300 as shown in FIG. 4A and/or FIG. 4B operates in a critical conduction mode (CRM) under a heavy load condition, and the asymmetrical half-bridge fly back switch-mode power converter 300 operates in a discontinuous conduction mode (DCM) under a light load condition. For example, the asymmetrical half-bridge fly back switch-mode power converter 300 as shown in FIG. 4A and/or FIG. 4B operates in a critical conduction mode (CRM) as shown in FIG. 5. As an example, the asymmetrical half-bridge fly back switch-mode power converter 300 as shown in FIG. 4A and/or FIG. 4B operates in a discontinuous conduction mode (DCM) as shown in FIG. 6.

FIG. 5 shows simplified timing diagrams for the asymmetrical half-bridge flyback switch-mode power converter 300 as shown in FIG. 4A and/or FIG. 4B in the critical conduction mode (CRM) according to certain embodiments of the present disclosure. These diagrams are merely examples, which should not unduly limit the scope of the claims. One of ordinary skill in the art would recognize many variations, alternatives, and modifications. The waveform 525 represents the drive voltage 325 as a function of time, the waveform 535 represents the drive voltage 335 as a function of time, the waveform 517 represents the current 317 as a function of time, the waveform 553 represents the current 353 as a function of time, the waveform 551 represents the demagnetization signal 951 (e.g., DEM_off) as a function of time, the waveform 543 represents the turning-off control signal 943 (e.g., ZVS_off) as a function of time, and the waveform 531 represents the mode and/or frequency control signal 931 (e.g., DCM_on) as a function of time. For example, the waveforms 525, 535, 517, 553, 551, 543, and 531 describe the operation of the asymmetrical half-bridge fly back switch-mode power converter 300 as shown in FIG. 4A in the critical conduction mode (CRM). As an example, the waveforms 525, 535, 517, 553, 551, 543, and 531 describe the operation of the asymmetrical half-bridge flyback switch-mode power converter 300 as shown in FIG. 4B in the critical conduction mode (CRM).

At time tso, the drive voltage 325 changes from a logic low level to a logic high level as shown by the waveform 525, and the transistor 320 becomes turned on according to some embodiments. For example, at time $t_{50}$, the mode and/or frequency control signal 931 (e.g., DCM_on) is at the logic high level as shown by the waveform 531.

From time $t_{50}$ to time $t_{51}$, the drive voltage 325 remains at the logic high level as shown by the waveform 525, and the transistor 320 remains turned on according to certain embodiments. For example, from time $t_{50}$ to time $t_{51}$, the current 353 increases with time, as shown by the waveform 553. As an example, during time $t_{50}$ and time $t_{51}$, after the current 353 becomes positive, the current 353 flows to the capacitor terminal 356, and the voltage 351 charges the primary winding 310 through the capacitor 352. In some examples, from time $t_{50}$ to time $t_{51}$, the mode and/or frequency control signal 931 (e.g., DCM_on) remains at the logic high level as shown by the waveform 531.

At time $t_{51}$, the drive voltage 325 changes from the logic high level to the logic low level as shown by the waveform 525, and the transistor 320 becomes turned off according to some embodiments. For example, at time $t_{51}$, the voltage 351 stops charging the primary winding 310. As an example, at time $t_{51}$, the current 353 reaches a current value 554 (e.g., $I_p$), wherein the current value 554 is positive. In certain examples, at time $t_{51}$, the mode and/or frequency control signal 931 (e.g., DCM_on) is at the logic high level as shown by the waveform 531.

From time $t_{51}$ to time $t_{52}$, the current 353 (e.g., $I_{Lr}$) is used to charge the parasitic capacitor of the transistor 320 and discharge the parasitic capacitor of the transistor 330, and the voltage 327 decreases with time according to certain embodiments. For example, from time $t_{51}$ to time $t_{52}$, the mode and/or frequency control signal 931 (e.g., DCM_on) remains at the logic high level as shown by the waveform 531.

At time $t_{52}$, the drive voltage 335 changes from the logic low level to the logic high level as shown by the waveform 535, and the transistor 330 becomes turned on according to some embodiments. For example, at time $t_{52}$, the voltage 327 decreases to zero volts. As an example, at time $t_{52}$, the transistor 330 becomes turned on with low-voltage switching and/or zero-voltage switching. As an example, at time $t_{52}$, the mode and/or frequency control signal 931 (e.g., DCM_on) is at the logic high level as shown by the waveform 531.

From time $t_{52}$ to time $t_{53}$, the drive voltage 335 remains at the logic high level as shown by the waveform 535, and the transistor 330 remains turned on according to certain embodiments. In some examples, from time $t_{52}$ to time $t_{53}$, the current 343 (e.g., $I_{Do}$) has a positive value. For example, from time $t_{52}$ to time $t_{53}$, through the resonance of the capacitor 352 and the inductor 318 (e.g., with the leakage inductance $L_r$), the current 353 (e.g., $I_{Lr}$) decreases to zero and then becomes negative as shown by the waveform 353. As an example, from time $t_{52}$ to time $t_{53}$, the mode and/or frequency control signal 931 (e.g., DCM_on) remains at the logic high level as shown by the waveform 531. In certain examples, from time $t_{52}$ to time $t_{53}$, the current 317 (e.g., $I_{Lm}$) has a positive value as shown by the waveform 517. For example, from time $t_{52}$ to time $t_{53}$, the current 317 (e.g., $I_{Lm}$) flows from the capacitor terminal 358 to the primary winding 310. As an example, from time $t_{52}$ to time t53, the current 317 (e.g., $I_{Lm}$) decreases (e.g., decreases linearly) with time from the current value 554 (e.g., $I_p$) to zero amp as shown by the waveform 517.

At time $t_{53}$, the demagnetization signal 951 (e.g., DEM_off) changes from the logic low level to the logic high level as shown by the waveform 551 according to some embodiments. For example, at time $t_{53}$, the current 317 (e.g., $I_{Lm}$) is equal to zero amp as shown by the waveform 517, indicating the end of a demagnetization process of the primary winding 310. As an some examples, the current value 556 represents zero amp. In certain examples, the time duration from time $t_{52}$ to time $t_{53}$ represents the demagnetization period for the primary winding 310. As an example, time $t_{52}$ is the beginning of the demagnetization period for the primary winding 310, and time $t_{53}$ is the end of the demagnetization period for the primary winding 310. In some examples, at time $t_{53}$, the drive voltage 335 is at the logic high level as shown by the waveform 535, and the transistor 330 is turned on. For example, at time t53, the mode and/or frequency control signal 931 (e.g., DCM_on) is at the logic high level as shown by the waveform 531.

From time $t_{53}$ to time $t_{54}$, the drive voltage 335 remains at the logic high level as shown by the waveform 535, and the transistor 330 remains turned on according to certain embodiments. For example, the time duration from time $t_{53}$ to time $t_{54}$ is equal to the first predetermined length of time (e.g., $T_{ZVS\_C}$). As an example, the time duration from time $t_{63}$ to time $t_{54}$ is determined based at least in part on the voltage 361. In some examples, from time $t_{53}$ to time $t_{54}$, the mode and/or frequency control signal 931 (e.g., DCM_on) remains at the logic high level as shown by the waveform 531.

At time $t_{54}$, the drive voltage 335 changes from the logic high level to the logic low level as shown by the waveform 535, and the transistor 330 becomes turned off according to some embodiments. In certain examples, at time $t_{54}$, the turning-off control signal 943 (e.g., ZVS_off) changes from the logic low level to the logic high level as shown by the waveform 543, so that the drive voltage 335 changes from the logic high level to the logic low level and the transistor 330 becomes turned off. For example, at time $t_{54}$, the capacitor 352 stops discharging. As an example, at time $t_{54}$, the current 353 reaches a current value 555 (e.g., $I_n$), wherein the current value 555 is negative. In some examples, at time $t_{54}$, the mode and/or frequency control signal 931 (e.g., DCM_on) is at the logic high level as shown by the waveform 531.

From time $t_{54}$ to time $t_{55}$, the current 353 (e.g., $I_{Lr}$) is used to discharge the parasitic capacitor of the transistor 320 and charge the parasitic capacitor of the transistor 330, and the voltage 327 increases with time according to certain embodiments. For example, from time $t_{54}$ to time $t_{55}$, the current 353 flows from the capacitor terminal 356. As an example, from time $t_{54}$ to time $t_{55}$, the current 353 has a negative value that increases with time as shown by the waveform 553. In some examples, from time $t_{54}$ to time $t_{55}$, the mode and/or frequency control signal 931 (e.g., DCM_on) remains at the logic high level as shown by the waveform 531.

At time $t_{55}$, the drive voltage 325 changes from the logic low level to the logic high level as shown by the waveform 525, and the transistor 320 becomes turned on according to some embodiments. For example, at time $t_{55}$, the voltage 327 becomes equal to the voltage 151. As an example, at time $t_{55}$, the transistor 320 becomes turned on with low-voltage switching and/or zero-voltage switching. In certain examples, at time $t_{55}$, the mode and/or frequency control signal 931 (e.g., DCM_on) is at the logic high level as shown by the waveform 531.

As mentioned above and further emphasized here, the timing diagrams as shown in FIG. 5 are merely examples, which should not unduly limit the scope of the claims. One of ordinary skill in the art would recognize many variations, alternatives, and modifications. In some examples, at time $t_{52}$, the voltage 327 becomes close to but is still larger than zero volts, and the transistor 330 becomes turned on with low-voltage switching, wherein the difference between the voltage 327 and zero volts is small. In certain examples, at time $t_{55}$, the voltage 327 becomes close to but is still smaller than the voltage 351, and the transistor 320 becomes turned on with low-voltage switching, wherein the difference between the voltage 327 and the voltage 351 is small. As an example, immediately before the transistor 330 becomes turned on at time $t_{55}$, the voltage 351 minus the voltage 327 is equal to 50 volts.

FIG. 6 shows simplified timing diagrams for the asymmetrical half-bridge flyback switch-mode power converter 300 as shown in FIG. 4A and/or FIG. 4B in the discontinuous conduction mode (DCM) according to some embodiments of the present disclosure. These diagrams are merely examples, which should not unduly limit the scope of the claims. One of ordinary skill in the art would recognize many variations, alternatives, and modifications. The waveform 625 represents the drive voltage 325 as a function of time, the waveform 635 represents the drive voltage 335 as a function of time, the waveform 617 represents the current 317 as a function of time, the waveform 653 represents the current 353 as a function of time, the waveform 651 represents the demagnetization signal 951 (e.g., DEM_off) as a function of time, the waveform 643 represents the turning-off control signal 943 (e.g., ZVS_off) as a function of time, and the waveform 631 represents the mode and/or frequency control signal 931 (e.g., DCM_on) as a function of time. For example, the waveforms 625, 635, 617, 653, 651, 643, and 631 describe the operation of the asymmetrical half-bridge flyback switch-mode power converter 300 as shown in FIG. 4A in the discontinuous conduction mode (DCM). As an example, the waveforms 625, 635, 617, 653, 651, 643, and 631 describe the operation of the asymmetrical half-bridge flyback switch-mode power converter 300 as shown in FIG. 4B in the discontinuous conduction mode (DCM).

At time $t_{60}$, the drive voltage 325 changes from a logic low level to a logic high level as shown by the waveform 625, and the transistor 320 becomes turned on according to some embodiments. For example, at time $t_{60}$, the turning-on control signal 971 (e.g., up_on) changes from the logic low level to the logic high level, and in response, the drive voltage generator 920 changes the drive voltage 325 from the logic low level to the logic high level in order to turn on the transistor 320. As an example, at time $t_{60}$, the drive voltage 335 is at the logic low level as shown by the waveform 635, and the transistor 330 is turned off.

From time $t_{60}$ to time $t_{61}$, the drive voltage 325 remains at the logic high level as shown by the waveform 625, and the transistor 320 remains turned on according to certain embodiments. For example, from time $t_{60}$ to time $t_{61}$, the current 353 increases with time, as shown by the waveform 653. As an example, from time $t_{60}$ to time $t_{61}$, the drive voltage 335 remains at the logic low level as shown by the waveform 635, and the transistor 330 remains turned off. In some examples, from time $t_{60}$ to time $t_{61}$, the current sensing voltage 345 increases with time.

At time $t_{61}$, the drive voltage 325 changes from the logic high level to the logic low level as shown by the waveform 625, and the transistor 320 becomes turned off according to some embodiments. For example, at time $t_{61}$, the turning-off control signal 911 (e.g., CV_off) changes from the logic low level to the logic high level, and in response, the drive voltage generator 920 changes the drive voltage 325 from the logic high level to the logic low level in order to turn off the transistor 320. As an example, at time $t_{61}$, the drive voltage 335 is at the logic low level as shown by the waveform 635, and the transistor 330 is turned off. In certain examples, at time $t_{61}$, the current 353 reaches a current value 654 (e.g., $I_p$), wherein the current value 654 is positive.

From time $t_{61}$ to time $t_{62}$, the drive voltage 325 remains at the logic low level as shown by the waveform 625, and the drive voltage 335 remains at the logic low level as shown by the waveform 635 according to certain embodiments. For example, from time t61 to time $t_{62}$, the transistor 320 remains turned off, and the transistor 330 also remains turned off. As an example, the time duration from time $t_{61}$ to time $t_{62}$ is equal to the first predetermined dead-time duration (e.g., a first predetermined delay) as determined by the dead-time controller 970. In some examples, from time $t_{61}$ to time $t_{62}$, the current 353 (e.g., $I_{Lr}$) is used to discharge the parasitic capacitor of the transistor 330 and charge the parasitic capacitor of the transistor 320. For example, from time $t_{61}$ to time $t_{62}$, the voltage 327 decreases with time.

At time $t_{62}$, the drive voltage 335 changes from the logic low level to the logic high level as shown by the waveform 635, and the transistor 330 becomes turned on according to some embodiments. For example, at time $t_{62}$, the turning-on control signal 973 (e.g., down_on) changes from the logic low level to the logic high level, and in response, the drive voltage generator 980 changes the drive voltage 335 from the logic low level to the logic high level in order to turn on the transistor 330. As an example, at time $t_{62}$, the drive voltage 325 is at the logic low level as shown by the waveform 625, and the transistor 320 is turned off. In certain examples, at time $t_{62}$, the voltage 327 reached zero volts. For example, at time $t_{62}$, the transistor 330 becomes turned on with low-voltage switching and/or zero-voltage switching.

From time $t_{62}$ to time $t_{63}$, the drive voltage 335 remains at the logic high level as shown by the waveform 635, and the transistor 330 remains turned on according to certain embodiments. For example, from time $t_{62}$ to time $t_{63}$, the drive voltage 325 remains at the logic low level as shown by the waveform 625, and the transistor 320 remains turned off. As an example, from time $t_{62}$ to time $t_{63}$, through the resonance of the capacitor 352 and the inductor 318 (e.g., with the leakage inductance $L_r$), the current 353 (e.g., $I_{Lr}$) decreases to zero and then becomes negative as shown by the waveform 653. In some examples, from time $t_{62}$ to time $t_{63}$, the current 353 (e.g., $I_{Lr}$) decreases to zero and then becomes negative as shown by the waveform 653. In certain examples, from time $t_{62}$ to time $t_{63}$, the current 317 (e.g., $I_{Lm}$) has a positive value as shown by the waveform 617. For example, from time $t_{62}$ to time $t_{63}$, the current 317 (e.g., $I_{Lm}$) flows from the capacitor terminal 358 to the primary winding 310. As an example, from time $t_{62}$ to time $t_{63}$, the current 317 (e.g., $I_{Lm}$) decreases (e.g., decreases linearly) with time from the current value 654 (e.g., $I_p$) to zero amp as shown by the waveform 617.

At time $t_{63}$, the demagnetization signal 951 (e.g., DEM_off) changes from the logic low level to the logic high level as shown by the waveform 651 according to some embodiments. For example, at time $t_{63}$, the current 317 (e.g., $I_{Lm}$) is equal to zero amp as shown by the waveform 617, indicating the end of a demagnetization process of the primary winding 310. As an example, the current value 656 represents zero amp. In certain examples, the time duration from time $t_{62}$ to time $t_{63}$ represents the demagnetization period for the primary winding 310. As an example, time $t_{62}$ is the beginning of the demagnetization period for the primary winding 310, and time $t_{63}$ is the end of the demagnetization period for the primary winding 310. In some examples, in response to the demagnetization signal 951 (e.g., DEM_off) changing from the logic low level to the logic high level, the drive voltage 335 changes from the logic high level to the logic low level at time $t_{63}$ as shown by the waveform 635, and the transistor 330 becomes turned off at time $t_{63}$. For example, at time $t_{63}$, the drive voltage 325 is at the logic low level as shown by the waveform 625, and the transistor 320 is turned off.

From time $t_{63}$ to time $t_{64}$, the drive voltage 325 remains at the logic low level as shown by the waveform 625, and the drive voltage 335 also remains at the logic low level as shown by the waveform 635 according to certain embodiments. In some examples, from time $t_{63}$ to time $t_{64}$, the transistor 320 remains turned off, and the transistor 330 also remains turned off. In certain examples, from time $t_{63}$ to time $t_{64}$, the resonance of the parasitic capacitor of the transistor 320, the parasitic capacitor of the transistor 330, the inductor 316 (e.g., with the primary inductance $L_p$), and the inductor 318 (e.g., with the leakage inductance $L_r$) occurs according to certain embodiments. For example, from time $t_{63}$ to time $t_{64}$, the resonance period is equal to $T_d$.

At time $t_{64}$, the drive voltage 335 changes from the logic low level to the logic high level as shown by the waveform 635, and the transistor 330 becomes turned on according to some embodiments. For example, at time $t_{64}$, the mode and/or frequency control signal 931 (e.g., DCM_on) changes from the logic low level to the logic high level as shown by the waveform 631. As an example, in response to the mode and/or frequency control signal 931 (e.g., DCM_on) changing from the logic low level to the logic high level, at time $t_{64}$, the drive voltage generator 980 changes the drive voltage 335 from the logic low level to the logic high level in order to turn on the transistor 330. In certain examples, at time $t_{64}$, the drive voltage 325 is at the logic low level as shown by the waveform 625, and the transistor 320 is turned off.

From time $t_{64}$ to time $t_{65}$, the drive voltage 335 remains at the logic high level as shown by the waveform 635, and the transistor 330 remains turned on according to certain embodiments. For example, the time duration from time $t_{64}$ to time $t_{65}$ is equal to the second predetermined length of time (e.g., $T_{ZVS\_D}$)). As an example, the time duration from time $t_{64}$ to time $t_{65}$ is determined based at least in part on the voltage 361. In some examples, from time $t_{64}$ to time $t_{65}$, the drive voltage 325 remains at the logic low level as shown by the waveform 625, and the transistor 320 remains turned off. In certain examples, from time $t_{64}$ to time $t_{65}$, the current 353 (e.g., $I_{Lr}$) has a negative value, and decreases with time as shown by the waveform 653. For example, from time $t_{64}$ to time $t_{65}$, the current 353 (e.g., $I_{Lr}$) flows from the capacitor terminal 356.

At time $t_{65}$, the drive voltage 335 changes from the logic high level to the logic low level as shown by the waveform 635, and the transistor 330 becomes turned off according to some embodiments. For example, at time $t_{65}$, the turning-off control signal 943 (e.g., ZVS_off) changes from the logic low level to the logic high level as shown by the waveform 643, and in response, the drive voltage generator 980 changes the drive voltage 335 from the logic high level to the logic low level in order to turn off the transistor 330. As an example, at time $t_{65}$, the drive voltage 325 is at the logic low level as shown by the waveform 625, and the transistor 320 is turned off. In certain embodiments, at time $t_{65}$, the current 353 reaches a negative current value.

From time $t_{65}$ to time $t_{66}$, the drive voltage 325 remains at the logic low level as shown by the waveform 625, and the drive voltage 335 remains at the logic low level as shown by the waveform 635 according to certain embodiments. For example, from time $t_{65}$ to time $t_{66}$, the transistor 320 remains turned off, and the transistor 330 also remains turned off. As an example, the time duration from time $t_{65}$ to time $t_{66}$ is equal to the second predetermined dead-time duration (e.g., a second predetermined delay) as determined by the dead-time controller 970. In some examples, from time $t_{65}$ to time $t_{66}$, through the resonance of the parasitic capacitor of the transistor 320, the parasitic capacitor of the transistor 330, the inductor 316 (e.g., with the primary inductance $L_p$), and the inductor 318 (e.g., with the leakage inductance $L_r$), the current 353 (e.g., $I_{Lr}$) is used to discharge the parasitic capacitor of the transistor 320 and charge the parasitic capacitor of the transistor 330, and the voltage 327 increases with time.

At time $t_{66}$, the drive voltage 325 changes from the logic low level to the logic high level as shown by the waveform 625, and the transistor 320 becomes turned on according to some embodiments. For example, at time $t_{66}$, the turning-on control signal 971 (e.g., up_on) changes from the logic low level to the logic high level, and in response, the drive voltage generator 920 changes the drive voltage 325 from the logic low level to the logic high level in order to turn on the transistor 320. As an example, at time $t_{66}$, the drive voltage 335 is at the logic low level as shown by the waveform 635, and the transistor 330 is turned off. In certain examples, at time $t_{66}$, the voltage 327 becomes equal to the voltage 351. As an example, at time $t_{66}$, the transistor 320 becomes turned on with low-voltage switching and/or zero-voltage switching.

As mentioned above and further emphasized here, the timing diagrams as shown in FIG. 6 are merely examples, which should not unduly limit the scope of the claims. One of ordinary skill in the art would recognize many variations, alternatives, and modifications. In some examples, at time $t_{62}$, the voltage 327 becomes close to but is still larger than zero volts, and the transistor 330 becomes turned on with low-voltage switching, wherein the difference between the voltage 327 and zero volts is small. In certain examples, at time $t_{66}$, the voltage 327 becomes close to but is still smaller than the voltage 351, and the transistor 320 becomes turned on with low-voltage switching, wherein the difference between the voltage 327 and the voltage 351 is small. As an example, immediately before the transistor 330 becomes turned on at time $t_{66}$, the voltage 351 minus the voltage 327 is equal to 50 volts.

Figure 7:
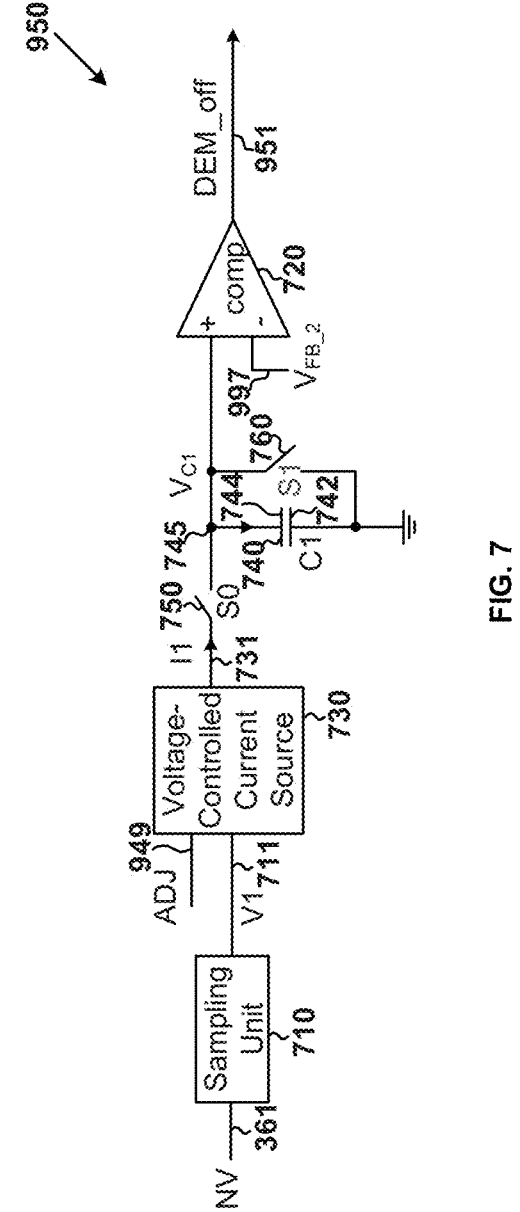
FIG. 7 is a simplified diagram showing the demagnetization detector as part of the asymmetrical half-bridge fly back switch-mode power converter as shown in FIG. 4A according to certain embodiments of the present disclosure.

FIG. 7 is a simplified diagram showing the demagnetization detector 950 as part of the asymmetrical half-bridge flyback switch-mode power converter 300 as shown in FIG. 4A according to certain embodiments of the present disclosure. This diagram is merely an example, which should not unduly limit the scope of the claims. One of ordinary skill in the art would recognize many variations, alternatives, and modifications. The demagnetization detector 950 as shown in FIG. 4A includes a sampling unit 710, a voltage-controlled current source 730, a capacitor 740, switches 750 and 760, and a comparator 720 according to some embodiments. As an example, the sampling unit 710 is implemented using one or more software components, one or more hardware components, and/or one or more combinations of software and hardware components, and/or the sampling unit 710 is implemented in one or more circuits, such as one or more analog circuits and/or one or more digital circuits. Although the above has been shown using a selected group of components for the demagnetization detector, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the sampling unit 710 receives the voltage 361 and generates a sampled voltage 711 based at least in part on the voltage 361. In some examples, the sampling unit 710 samples the voltage 361 during the demagnetization process of the primary winding 310, and in response generates the sampled voltage 711 (e.g., V1) to represent the voltage 361 during the demagnetization process of the primary winding 310. For example, the sampling unit 710 samples the voltage 361 at a time that is after time $t_{52}$ but before time $t_{53}$ as shown in FIG. 5, and in response generates the sampled voltage 711 (e.g., V1) to represent the voltage 361 at the time that is after time $t_{52}$ but before time $t_{53}$ (e.g., during the demagnetization process of the primary winding 310). As an example, the sampling unit 710 samples the voltage 361 at a time that is after time $t_{62}$ but before time $t_{63}$ as shown in FIG. 6, and in response generates the sampled voltage 711 (e.g., V1) to represent the voltage 361 at the time that is after time $t_{62}$ but before time $t_{63}$ (e.g., during the demagnetization process of the primary winding 310). In certain examples, the sampled voltage 711 is determined as follows:

$$V_1 = \frac{N_{aux}}{N_p} \times \frac{R_1}{R_1 + R_2} \times (N \times V_o) \qquad \text{(Equation 1)}$$

where $V_1$ represents the sampled voltage 711. Additionally, $N_{aux}$ represents the number of turns in the auxiliary winding 314, and $N_p$ represents the number of turns in the primary winding 310. Moreover, $R_1$ represents the resistance of the resistor 362, and $R_2$ represents the resistance of the resistor 360. Also, $V_o$ represents the output voltage 392, and N represents the turns ratio that is equal to the ratio of the number of turns in the primary winding 310 to the number of turns in the secondary winding 312.

In some embodiments, the voltage-controlled current source 730 receives the sampled voltage 711 (e.g., V1) and the adjustment signal 949 (e.g., ADJ) and generates a current 731 based at least in part on the sampled voltage 711 (e.g., V1) and the adjustment signal 949 (e.g., ADJ). For example, the current 731 (e.g., $I_1$) is determined as follows:

$$I_1 = k_1 \times V_1 \qquad \text{(Equation 2)}$$

where $I_1$ represents the current 731, and $V_1$ represents the sampled voltage 713. In certain examples, $k_1$ is a constant (e.g., a conversion value) that depends on the adjustment signal 949 (e.g., ADJ). For example, the voltage-controlled current source 730 determines the constant $k_1$ (e.g., a conversion value) based at least in part on the adjustment signal 949 (e.g., ADJ). As an example, the voltage-controlled current source 730 changes the constant $k_1$ (e.g., a conversion value) in response to a change in the adjustment signal 949 (e.g., ADJ).

In certain embodiments, during the demagnetization process of the primary winding 310 (e.g., from time $t_{52}$ to time $t_{53}$, and/or from time $t_{62}$ to time $t_{63}$), the switch 750 is closed and the switch 760 is open. In some examples, the capacitor 740 includes a capacitor terminal 742 that is biased to a ground voltage (e.g., 0 volt), and the capacitor 740) also includes a capacitor terminal 744 that is biased to a voltage 745. In certain examples, when the switch 750 is closed and the switch 760 is open (e.g., during the demagnetization process of the primary winding 310), the capacitor 740 is charged by the current 731 and the voltage 745 increases with time, until the switch 760 becomes closed.

In some embodiments, at the end of the demagnetization process of the primary winding 310, the switch 760 becomes closed and the switch 750 becomes open. For example, when the demagnetization signal 951 (e.g., DEM_off) changes from the logic low level to the logic high level (e.g. at time $t_{53}$ and/or at time $t_{63}$), the switch 760 becomes closed and the switch 750 becomes open. In certain examples, when the switch 760 is closed and the switch 750 is open, the capacitor 740 is discharged and the voltage 745 drops to the ground voltage (e.g., 0 volt).

According to certain embodiments, as shown in FIG. 5, at time $t_{52}$, the capacitor 740 starts being charged by the current 731 and the voltage 745 starts increasing with time. For example, from time $t_{52}$ to time $t_{53}$, the capacitor 740 remains being charged by the current 731 and the voltage 745 remains increasing with time. As an example, at time $t_{53}$, the capacitor 740 is discharged and the voltage 745 drops to the ground voltage (e.g., 0 volt).

According to some embodiments, as shown in FIG. 6, at time $t_{62}$, the capacitor 740 starts being charged by the current 731 and the voltage 745 starts increasing with time. For example, from time $t_{62}$ to time $t_{63}$, the capacitor 740 remains being charged by the current 731 and the voltage 745 remains increasing with time. As an example, at time $t_{65}$, the capacitor 740 is discharged and the voltage 745 drops to the ground voltage (e.g., 0 volt).

In certain embodiments, the comparator 720 receives the voltage 745 (e.g., $V_{c1}$) and the voltage 997 (e.g., $V_{FB\_2}$) and generates the demagnetization signal 951 (e.g., DEM_off) based at least in part on the voltage 745 (e.g., $V_{c1}$) and the voltage 997 (e.g., $V_{FB\_2}$). For example, if the voltage 745 (e.g., $V_{c1}$) becomes larger than the voltage 997 (e.g., $V_{FB\_2}$), the demagnetization signal 951 (e.g., DEM_off) changes from the logic low level to the logic high level. As an example, in response to the demagnetization signal 951 (e.g., DEM_off) changing from the logic low level to the logic high level, the capacitor 740 is discharged and the voltage 745 drops to the ground voltage (e.g., 0 volt), causing the demagnetization signal 951 (e.g., DEM_off) to change from the logic high level to the logic low level. In some examples, as shown in FIG. 7, the demagnetization period for the primary winding 310 is determined as follows:

$$T_{dem} = C_1 \times \frac{V_{FB\_2}}{I_1} = \frac{C_1 \times N_p \times (R_1 + R_2)}{k_1 \times N_{aux} \times R_1} \times \frac{V_{FB\_2}}{N \times V_o} \qquad \text{(Equation 3)}$$

where $T_{dem}$ represents the demagnetization period for the primary winding 310. Additionally, $C_1$ represents the capacitance of the capacitor 740, and $V_{FB\_2}$ represents the voltage 997. Moreover, $I_1$ represents the current 731, and $k_1$ is a constant that depends on the adjustment signal 949 (e.g., ADJ). Also, $N_{aux}$ represents the number of turns in the auxiliary winding 314, and $N_p$ represents the number of turns in the primary winding 310. Additionally, $R_1$ represents the resistance of the resistor 362, and $R_2$ represents the resistance of the resistor 360. Moreover, $V_o$ represents the output voltage 392, and N represents the turns ratio that is equal to the ratio of the number of turns in the primary winding 310 to the number of turns in the secondary winding 312.

In some embodiments, as shown in FIG. 5 and/or FIG. 6, during the demagnetization period for the primary winding 310, the current 317 (e.g., $I_{Lm}$) decreases (e.g., decreases linearly) with time from the current value 554 or the current value 654 to zero amp. In certain examples, the demagnetization period for the primary winding 310 is also determined as follows:

$$T_{dem} = \frac{L_p \times V_{FB\_2}}{R_{CS} \times N \times V_o} \qquad \text{(Equation 4)}$$

where $T_{dem}$ represents the demagnetization period for the primary winding 310. Additionally, $L_p$ represents the inductance of the inductor 316, and $V_{FB\_2}$ represents the voltage 997. Moreover, $R_{CS}$ represents the resistance of the resistor 344. Also, $V_o$ represents the output voltage 392, and N represents the turns ratio that is equal to the ratio of the number of turns in the primary winding 310 to the number of turns in the secondary winding 312.

According to certain embodiments, to ensure that the demagnetization period for the primary winding 310 as determined by Equation 3 equals the demagnetization period for the primary winding 310 as determined by Equation 4, the constant $k_1$ is adjusted by the adjustment signal 949 (e.g., ADJ) in order to satisfy the following:

$$k_1 = \frac{R_{CS} \times N_p \times (R_1 + R_2)}{L_p \times N_{aux} \times R_1} \times C_1 \qquad \text{(Equation 5)}$$

where $k_1$ represents the constant that depends on the adjustment signal 949 (e.g., ADJ). Additionally, $R_{CS}$ represents the resistance of the resistor 344, and $L_p$ represents the inductance of the inductor 316. Moreover, $N_{aux}$ represents the number of turns in the auxiliary winding 314, and $N_p$ represents the number of turns in the primary winding 310. Also, $R_1$ represents the resistance of the resistor 362, and $R_2$ represents the resistance of the resistor 360. In some examples, the adjustment signal 949 (e.g., ADJ) is adjusted so that the constant $k_1$ satisfies Equation 5.

According to some embodiments, to ensure that the demagnetization period for the primary winding 310 as determined by Equation 3 equals the demagnetization period for the primary winding 310 as determined by Equation 4, the constant $k_1$ is adjusted by the adjustment signal 949 (e.g., ADJ) in order to match with the inductor discharging slope when the transistor 330 is turned on. In some examples, the inductor discharging slope when the transistor 330 is turned on is determined by the demagnetization detector 950. In certain examples, the adjustment signal 949 (e.g., ADJ) is adjusted so that the constant $k_1$ matches with the inductor discharging slope when the transistor 330 is turned on.

Figure 8:
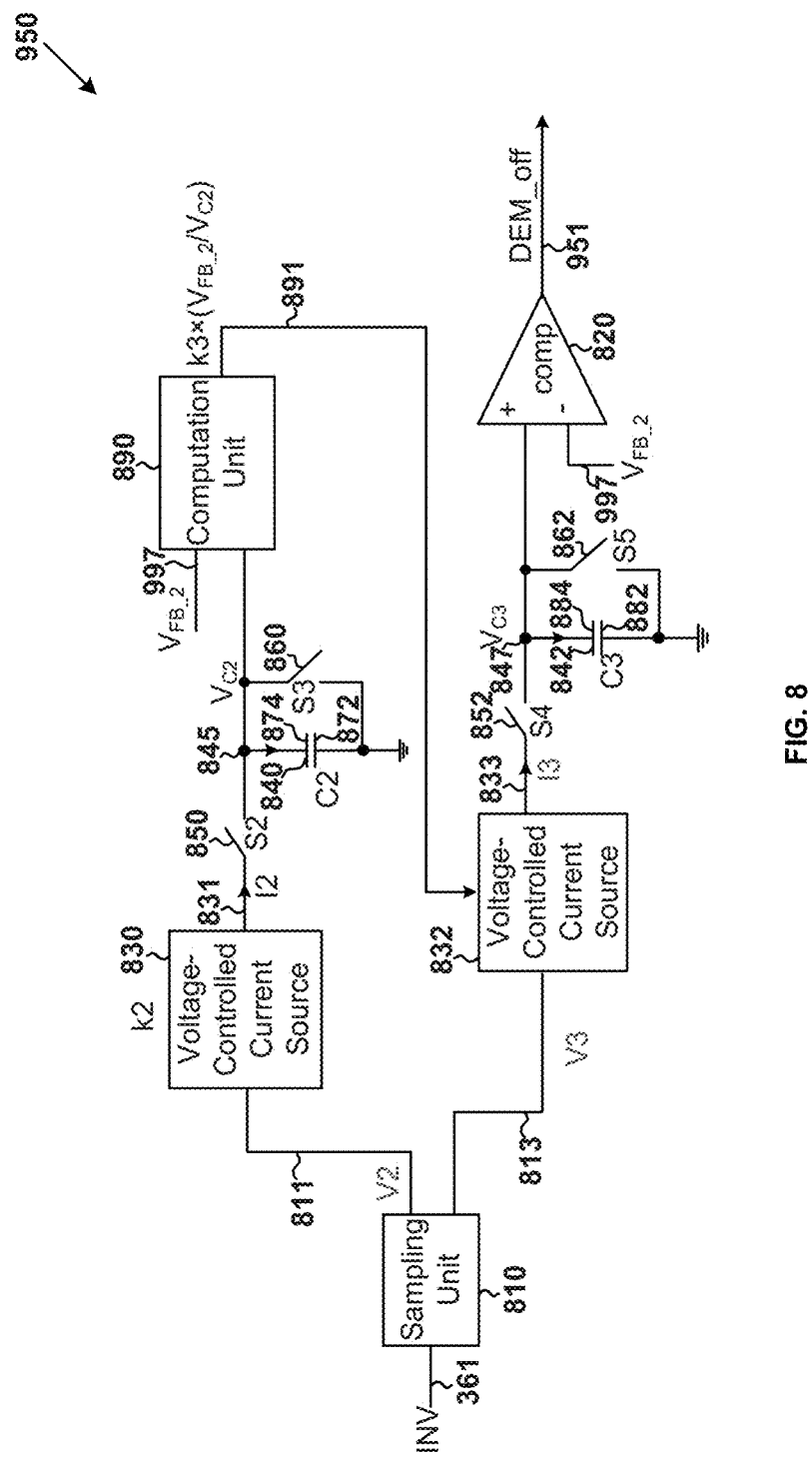
FIG. 8 is a simplified diagram showing the demagnetization detector as part of the asymmetrical half-bridge fly back switch-mode power converter as shown in FIG. 4B according to some embodiments of the present disclosure.

FIG. 8 is a simplified diagram showing the demagnetization detector 950 as part of the asymmetrical half-bridge flyback switch-mode power converter 300 as shown in FIG. 4B according to some embodiments of the present disclosure. This diagram is merely an example, which should not unduly limit the scope of the claims. One of ordinary skill in the art would recognize many variations, alternatives, and modifications. The demagnetization detector 950 as shown in FIG. 4B includes a sampling unit 810, voltage-controlled current sources 830 and 832, capacitor 840 and 842, switches 850, 852, 860 and 862, a computation unit 890, and a comparator 820 according to certain embodiments. For example, the sampling unit 810 is implemented using one or more software components, one or more hardware components, and/or one or more combinations of software and hardware components, and/or the sampling unit 810 is implemented in one or more circuits, such as one or more analog circuits and/or one or more digital circuits. As an example, the computation unit 890 is implemented using one or more software components, one or more hardware components, and/or one or more combinations of software and hardware components, and/or the computation unit 890 is implemented in one or more circuits, such as one or more analog circuits and/or one or more digital circuits. Although the above has been shown using a selected group of components for the demagnetization detector, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the sampling unit 810 receives the voltage 361 and generates sampled voltages 811 and 813 based at least in part on the voltage 361. In some examples, the sampling unit 810 samples the voltage 361 when the transistor 320 is turned on, and in response generates the sampled voltage 811 (e.g., V2) to represent the voltage 361 when the transistor 320 is turned on. For example, the sampling unit 810 samples the voltage 361 at a time that is after time $t_{50}$ but before time $t_{51}$ as shown in FIG. 5, and in response generates the sampled voltage 811 (e.g., V2) to represent the voltage 361 at the time that is after time $t_{50}$ but before time $t_{51}$ (e.g., when the transistor 320 is turned on). As an example, the sampling unit 810 samples the voltage 361 at a time that is after time $t_{60}$ but before time $t_{61}$ as shown in FIG. 6, and in response generates the sampled voltage 811 (e.g., V2) to represent the voltage 361 at the time that is after time $t_{60}$ but before time $t_{61}$ (e.g., when the transistor 320 is turned on). In certain examples, the sampled voltage 811 is determined as follows:

$$V_2 = \frac{N_{aux}}{N_p} \times \frac{R_1}{R_1 + R_2} \times (V_{in} - N \times V_o) \qquad \text{(Equation 6)}$$

where $V_2$ represents the sampled voltage 811. Additionally, $N_{aux}$ represents the number of turns in the auxiliary winding 314, and $N_p$ represents the number of turns in the primary winding 310. Moreover, $R_1$ represents the resistance of the resistor 362, and $R_2$ represents the resistance of the resistor 360. Also, $V_{in}$ represents the voltage 351, and $V_o$ represents the output voltage 392. Additionally, N represents the turns ratio that is equal to the ratio of the number of turns in the primary winding 310 to the number of turns in the secondary winding 312.

In some embodiments, the voltage-controlled current source 830 receives the sampled voltage 811 (e.g., V2) and generates a current 831 based at least in part on the sampled voltage 811 (e.g., V2). For example, the current 831 (e.g., $I_2$) is determined as follows:

$$I_2 = k_2 \times V_2 \qquad \text{(Equation 7)}$$

where $I_2$ represents the current 831, and $V_2$ represents the sampled voltage 811. Additionally, $k_2$ is a predetermined constant.

In certain embodiments, when the transistor 320 is turned on (e.g., from time $t_{50}$ to time $t_{51}$, and/or from time $t_{60}$ to time $t_{61}$), the switch 850 is closed and the switch 860 is open. In some examples, the capacitor 840 includes a capacitor terminal 872 that is biased to a ground voltage (e.g., 0 volt), and the capacitor 840 also includes a capacitor terminal 874 that is biased to a voltage 845. In certain examples, when the switch 850 is closed and the switch 860 is open (e.g., when the transistor 320 is turned on), the capacitor 840 is charged by the current 831 and the voltage 845 increases with time, until the switch 860 becomes closed.

In some embodiments, when the transistor 320 becomes turned off, the switch 860 becomes closed and the switch 850 becomes open. For example, when the drive voltage 325 changes from the logic high level to the logic low level (e.g., at time $t_{51}$ and/or at time $t_{61}$), the switch 860 becomes closed and the switch 850 becomes open. In certain examples, when the switch 860 is closed and the switch 850 is open, the capacitor 840 is discharged and the voltage 845 drops to the ground voltage (e.g., 0 volt).

According to certain embodiments, as shown in FIG. 5, at time $t_{50}$, the capacitor 840 starts being charged by the current 831 and the voltage 845 starts increasing with time. For example, from time $t_{50}$ to time $t_{51}$, the capacitor 840 remains being charged by the current 831 and the voltage 845 remains increasing with time. As an example, at time $t_{51}$, the capacitor 840 is discharged and the voltage 845 drops to the ground voltage (e.g., 0 volt).

According to some embodiments, as shown in FIG. 6, at time $t_{60}$, the capacitor 840 starts being charged by the current 831 and the voltage 845 starts increasing with time. For example, from time $t_{60}$ to time $t_{61}$, the capacitor 840 remains being charged by the current 831 and the voltage 845 remains increasing with time. As an example, at time $t_{61}$, the capacitor 840 is discharged and the voltage 845 drops to the ground voltage (e.g., 0 volt).

In certain embodiments, immediately before the transistor 320 becomes turned off, the voltage 845 is determined as follows:

$$V_{c2} = k_2 \times (V_{in} - N \times V_o) \times \frac{N_{aux}}{N_p} \times \frac{R_1}{R_1 + R_2} \times \frac{T_{on}}{C_2} \qquad \text{(Equation 8)}$$

where $V_{c2}$ represents the voltage 845 immediately before the transistor 320 becomes turned off. Additionally, $k_2$ is a predetermined constant. Moreover, $V_{in}$ represents the voltage 351, and $V_o$ represents the output voltage 392. Also, N represents the turns ratio that is equal to the ratio of the number of turns in the primary winding 310 to the number of turns in the secondary winding 312. Additionally, $N_{aux}$ represents the number of turns in the auxiliary winding 314, and $N_p$ represents the number of turns in the primary winding 310. Moreover, $R_1$ represents the resistance of the resistor 362, and $R_2$ represents the resistance of the resistor 360. Also, $C_2$ represents the capacitance of the capacitor 840. Additionally, $T_{on}$ represents a length of time during which the transistor 320 remains turned on. For example, $T_{on}$ is equal to the length of time from time $t_{50}$ to time $t_{51}$ as shown in FIG. 5. As an example, $T_{on}$ is equal to the length of time from time $t_{60}$ to time $t_{61}$ as shown in FIG. 6.

In some embodiments, as shown in FIG. 4B, the length of time during which the transistor 320 remains turned on is determined as follows:

$$T_{on} = \frac{L_p \times V_{FB\_2}}{R_{CS} \times (V_{in} - N \times V_o)} \qquad \text{(Equation 9)}$$

where $T_{on}$ represents a length of time during which the transistor 320 remains turned on. Additionally, $L_p$ represents the inductance of the inductor 316, and $V_{FB\_2}$ represents the voltage 997. Moreover, $R_{CS}$ represents the resistance of the resistor 344. Also, $V_{in}$ represents the voltage 351, and $V_o$ represents the output voltage 392. Additionally, N represents the turns ratio that is equal to the ratio of the number of turns in the primary winding 310 to the number of turns in the secondary winding 312.

According to certain embodiments, based on Equations 7 and 8, immediately before the transistor 320 becomes turned off, the voltage 845 is determined as follows:

$$V_{c2} = k_2 \times \frac{N_{aux}}{N_p} \times \frac{R_1}{R_1 + R_2} \times \frac{L_p \times V_{FB\_2}}{R_{CS} \times C_2} \qquad \text{(Equation 10)}$$

where $V_{c2}$ represents the voltage 845 immediately before the transistor 320 becomes turned off. Additionally, $k_2$ is a predetermined constant. Moreover, $N_{aux}$ represents the number of turns in the auxiliary winding 314, and $N_p$ represents the number of turns in the primary winding 310. Also, $R_1$ represents the resistance of the resistor 362, and $R_2$ represents the resistance of the resistor 360. Additionally, $L_p$ represents the inductance of the inductor 316, and $V_{FB\_2}$ represents the voltage 997. Moreover, $R_{CS}$ represents the resistance of the resistor 344, and $C_2$ represents the capacitance of the capacitor 840.

According to some embodiments, the computation unit 890 receives the voltage 997 and the voltage 845 and generates a voltage 891 based at least in part on the voltage 997 and the voltage 845. For example, the voltage 891 (e.g., a conversion signal) is determined as follows:

$$V_{891} = k_3 \times \frac{V_{FB\_2}}{V_{c2}} \qquad \text{(Equation 11)}$$

where $V_{891}$ represents the voltage 891, and $k_3$ is a predetermined constant. Additionally, $V_{FB\_2}$ represents the voltage 997, and $V_{c2}$ represents the voltage 845 immediately before the transistor 320 becomes turned off.

In certain embodiments, the voltage-controlled current source 832 receives the sampled voltage 813 (e.g., V3) and the voltage 891 and generates a current 833 based at least in part on the sampled voltage 813 (e.g., V3) and the voltage 891. For example, the current 833 (e.g., $I_3$) is determined as follows:

$$I_3 = V_{891} \times V_3 \qquad \text{(Equation 12)}$$

where $I_3$ represents the current 833, $V_{891}$ represents the voltage 891, and $V_3$ represents the sampled voltage 813. For example, as shown by Equation 12, the current 833 is equal to the sampled voltage 813 multiplied by the magnitude of the voltage 891 (e.g., a magnitude of a conversion signal). As an example, based on Equations 11 and 12, the current 833 (e.g., $I_3$) is determined as follows:

$$I_3 = k_3 \times \frac{V_{FB\_2}}{V_{c2}} \times V_3 \qquad \text{(Equation 13)}$$

where $I_3$ represents the current 833, and $V_3$ represents the sampled voltage 813. Additionally, $k_3$ is a predetermined constant. Moreover, $V_{FB\_2}$ represents the voltage 997, and $V_{c2}$ represents the voltage 845 immediately before the transistor 320 becomes turned off.

In some embodiments, the sampling unit 810 receives the voltage 361 and generates a sampled voltage 813 based at least in part on the voltage 361. In some examples, the sampling unit 810 samples the voltage 361 during the demagnetization process of the primary winding 310, and in response generates the sampled voltage 813 (e.g., V3) to represent the voltage 361 during the demagnetization process of the primary winding 310. For example, the sampling unit 810 samples the voltage 361 at a time that is after time $t_{52}$ but before time $t_{53}$ as shown in FIG. 5, and in response generates the sampled voltage 813 (e.g., V3) to represent the voltage 361 at the time that is after time $t_{52}$ but before time $t_{53}$ (e.g., during the demagnetization process of the primary winding 310). As an example, the sampling unit 810 samples the voltage 361 at a time that is after time $t_{62}$ but before time $t_{63}$ as shown in FIG. 6, and in response generates the sampled voltage 813 (e.g., V3) to represent the voltage 361 at the time that is after time $t_{62}$ but before time $t_{63}$ (e.g., during the demagnetization process of the primary winding 310). In certain examples, the sampled voltage 813 is determined as follows:

$$V_3 = \frac{N_{aux}}{N_p} \times \frac{R_1}{R_1 + R_2} \times (N \times V_o) \qquad \text{(Equation 14)}$$

where $V_3$ represents the sampled voltage 813. Additionally, $N_{aux}$ represents the number of turns in the auxiliary winding 314, and $N_p$ represents the number of turns in the primary winding 310. Moreover, $R_1$ represents the resistance of the resistor 362, and $R_2$ represents the resistance of the resistor 360. Also, $V_o$ represents the output voltage 392, and N represents the turns ratio that is equal to the ratio of the number of turns in the primary winding 310 to the number of turns in the secondary winding 312.

In some embodiments, during the demagnetization process of the primary winding 310 (e.g., from time $t_{52}$ to time $t_{53}$, and/or from time $t_{62}$ to time $t_{63}$), the switch 852 is closed and the switch 862 is open. In some examples, the capacitor 842 includes a capacitor terminal 882 that is biased to a ground voltage (e.g., 0 volt), and the capacitor 842 also includes a capacitor terminal 884 that is biased to a voltage 847. In certain examples, when the switch 852 is closed and the switch 862 is open (e.g., during the demagnetization process of the primary winding 310), the capacitor 842 is charged by the current 833 and the voltage 847 increases with time, until the switch 862 becomes closed.

In certain embodiments, at the end of the demagnetization process of the primary winding 310, the switch 862 becomes closed and the switch 852 becomes open. For example, when the demagnetization signal 951 (e.g., DEM_off) changes from the logic low level to the logic high level (e.g. at time $t_{53}$ and/or at time $t_{63}$), the switch 862 becomes closed and the switch 852 becomes open. In certain examples, when the switch 862 is closed and the switch 852 is open, the capacitor 842 is discharged and the voltage 847 drops to the ground voltage (e.g., 0 volt).

According to certain embodiments, as shown in FIG. 5, at time $t_{52}$, the capacitor 842 starts being charged by the current 833 and the voltage 847 starts increasing with time. For example, from time $t_{52}$ to time $t_{53}$, the capacitor 842 remains being charged by the current 833 and the voltage 847 remains increasing with time. As an example, at time $t_{53}$, the capacitor 842 is discharged and the voltage 847 drops to the ground voltage (e.g., 0 volt).

According to some embodiments, as shown in FIG. 6, at time $t_{62}$, the capacitor 842 starts being charged by the current 833 and the voltage 847 starts increasing with time. For example, from time $t_{62}$ to time $t_{63}$, the capacitor 842 remains being charged by the current 833 and the voltage 847 remains increasing with time. As an example, at time $t_{63}$, the capacitor 842 is discharged and the voltage 847 drops to the ground voltage (e.g., 0 volt).

In certain embodiments, the comparator 820 receives the voltage 847 (e.g., $V_{c3}$) and the voltage 997 (e.g., $V_{FB\_2}$) and generates the demagnetization signal 951 (e.g., DEM_off) based at least in part on the voltage 847 (e.g., $V_{c3}$) and the voltage 997 (e.g., $V_{FB\_2}$). For example, if the voltage 847 (e.g., $V_{c3}$) becomes larger than the voltage 997 (e.g., $V_{FB\_2}$), the demagnetization signal 951 (e.g., DEM_off) changes from the logic low level to the logic high level. As an example, in response to the demagnetization signal 951 (e.g., DEM_off) changing from the logic low level to the logic high level, the capacitor 842 is discharged and the voltage 847 drops to the ground voltage (e.g., 0 volt), causing the demagnetization signal 951 (e.g., DEM_off) to change from the logic high level to the logic low level. In some examples, as shown in FIG. 8, the demagnetization period for the primary winding 310 is determined as follows:

$$T_{dem} = C_3 \times \frac{V_{FB\_2}}{I_3} = \frac{C_3 \times k_2}{C_2 \times k_3} \times \frac{L_p \times V_{FB\_2}}{R_{CS} \times (N \times V_o)} \qquad \text{(Equation 15)}$$

where $T_{dem}$ represents the demagnetization period for the primary winding 310. Additionally, $C_3$ represents the capacitance of the capacitor 842, and $C_2$ represents the capacitance of the capacitor 840. Moreover, $V_{FB\_2}$ represents the voltage 997, and $I_3$ represents the current 833. Also, $k_2$ is a predetermined constant, and $k_3$ is also a predetermined constant. Additionally, $L_p$ represents the inductance of the inductor 316, and $V_{FB\_2}$ represents the voltage 997. Moreover, $R_{CS}$ represents the resistance of the resistor 344. Also, $V_o$ represents the output voltage 392, and N represents the turns ratio that is equal to the ratio of the number of turns in the primary winding 310 to the number of turns in the secondary winding 312.

In some embodiments, as shown in FIG. 5 and/or FIG. 6, during the demagnetization period for the primary winding 310, the current 317 (e.g., $I_{Lm}$) decreases (e.g., decreases linearly) with time from the current value 554 or the current value 654 to zero amp. In certain examples, the demagnetization period for the primary winding 310 is also determined as follows:

$$T_{dem} = \frac{L_p \times V_{FB\_2}}{R_{CS} \times N \times V_o} \qquad \text{(Equation 16)}$$

where $T_{dem}$ represents the demagnetization period for the primary winding 310. Additionally, $L_p$ represents the inductance of the inductor 316, and $V_{FB\_2}$ represents the voltage 997. Moreover, $R_{CS}$ represents the resistance of the resistor 344. Also, $V_o$ represents the output voltage 392, and N represents the turns ratio that is equal to the ratio of the number of turns in the primary winding 310 to the number of turns in the secondary winding 312.

According to certain embodiments, to ensure that the demagnetization period for the primary winding 310 as determined by Equation 15 equals the demagnetization period for the primary winding 310 as determined by Equation 16, the following condition needs to be satisfied:

$$\frac{C_3 \times k_2}{C_2 \times k_3} = 1 \qquad \text{(Equation 17)}$$

where $C_3$ represents the capacitance of the capacitor 842, and $C_2$ represents the capacitance of the capacitor 840. Additionally, $k_2$ is a predetermined constant, and $k_3$ is also a predetermined constant. In some examples, the constant $k_2$ and the constant $k_3$ are predetermined so that Equation 17 is satisfied.

Figure 9:
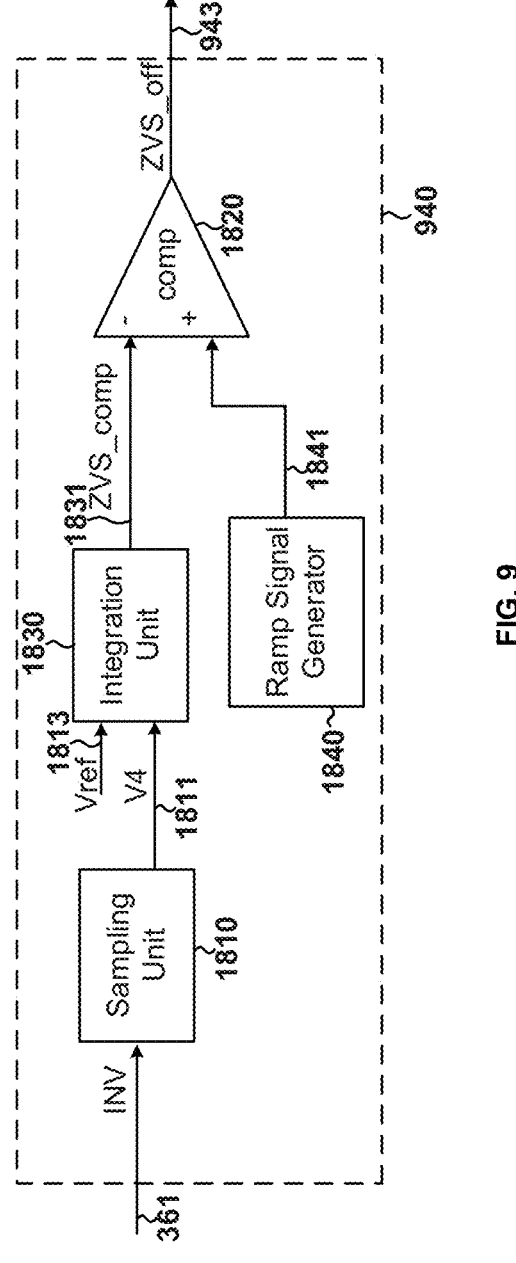
FIG. 9 is a simplified diagram showing the turning-off controller as part of the asymmetrical half-bridge fly back switch-mode power converter 300 as shown in FIG. 4A and/or FIG. 4B according to some embodiments of the present disclosure.

FIG. 9 is a simplified diagram showing the turning-off controller 940 as part of the asymmetrical half-bridge fly-back switch-mode power converter 300 as shown in FIG. 4A and/or FIG. 4B according to some embodiments of the present disclosure. This diagram is merely an example, which should not unduly limit the scope of the claims. One of ordinary skill in the art would recognize many variations, alternatives, and modifications. The turning-off controller 940 includes a sampling unit 1810, an integration unit 1830, a ramp signal generator 1840, and a comparator 1820. For example, the sampling unit 1810 is implemented using one or more software components, one or more hardware components, and/or one or more combinations of software and hardware components, and/or the sampling unit 1810 is implemented in one or more circuits, such as one or more analog circuits and/or one or more digital circuits. As an example, the integration unit 1830 is implemented using one or more software components, one or more hardware components, and/or one or more combinations of software and hardware components, and/or the integration unit 1830 is implemented in one or more circuits, such as one or more analog circuits and/or one or more digital circuits. Although the above has been shown using a selected group of components for the turning-off controller, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the sampling unit 1810 receives the voltage 361 and generates a sampled voltage 1811 based at least in part on the voltage 361. In some examples, the sampled voltage 1811 (e.g., V4) is received by the integration unit 1830, which also receives a reference voltage 1813 (e.g., $V_{ref}$). For example, the integration unit 1830 determines a difference between the sampled voltage 1811 (e.g., V4) and the reference voltage 1813 (e.g., $V_{ref}$), integrate the difference over time, and generates a compensation signal 1831 (e.g., ZVS_comp) to represent the result of the integration. As an example, the reference voltage 1813 (e.g., $V_{ref}$) is equal to 0.2 volts. In some examples, the ramp signal generator 840 generates a ramp signal 1841. For example, the ramp signal 1841 is a periodic signal. As an example, the ramp signal 1841 increases linearly with time at a constant slope. In some embodiments, the comparator 1820 receives the compensation signal 1831 (e.g., ZVS_comp) and the ramp signal 1841 and generates the turning-off control signal 943 (e.g., ZVS_off) based at least in part on the compensation signal 1831 (e.g., ZVS_comp) and the ramp signal 1841.

In some examples, the sampled voltage 1811 (e.g., V4) represents the voltage 327 immediately before the transistor 320 becomes turned on. For example, the sampled voltage 1811 (e.g., V4) is directly proportional to the voltage 327 immediately before the transistor 320 becomes turned on. In certain examples, the sampled voltage 1811 (e.g., V4) represents a change in the voltage 327 in response to the transistor 320 changing from being turned off to being turned on. For example, the sampled voltage 1811 (e.g., V4)

is directly proportional to a change in the voltage 327 in response to the transistor 320 changing from being turned off to being turned on. In certain embodiments, the reference voltage 1813 is a predetermined constant voltage. In some embodiments, the reference voltage 1813 is generated by the sampling unit 1810 that samples the voltage 361 when the transistor 320 is turned on.

As shown in FIG. 9, the comparator 1820 compares the compensation signal 1831 (e.g., ZVS_comp) and the ramp signal 1841 and generates the turning-off control signal 943 (e.g., ZVS_off) based at least in part on the comparison according to certain embodiments. For example, when the transistor 330 becomes turned on, the ramp signal 1841 starts increasing linearly with time. As an example, when the ramp signal 1841 becomes larger than the compensation signal 1831 (e.g., ZVS_comp), the comparator 1820 changes the turning-off control signal 943 (e.g., ZVS_off) from the logic low level to the logic high level in order to turn off the transistor 330.

Figure 10:
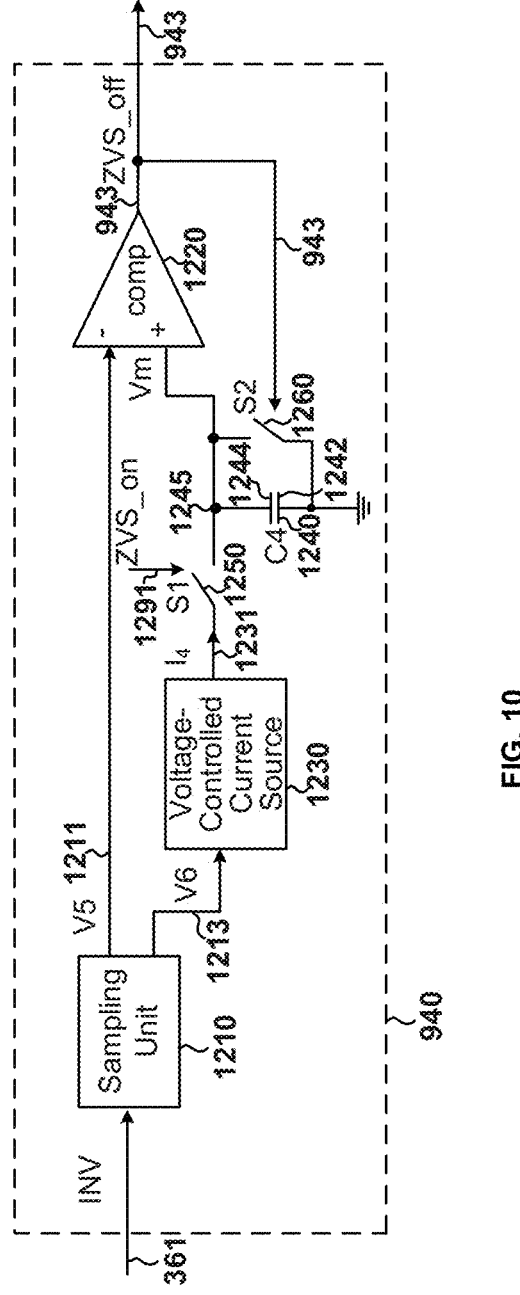
FIG. 10 is a simplified diagram showing the turning-off controller as part of the asymmetrical half-bridge flyback switch-mode power converter as shown in FIG. 4A and/or FIG. 4B according to certain embodiments of the present disclosure.

FIG. 10 is a simplified diagram showing the turning-off controller 940 as part of the asymmetrical half-bridge fly back switch-mode power converter 300 as shown in FIG. 4A and/or FIG. 4B according to certain embodiments of the present disclosure. This diagram is merely an example, which should not unduly limit the scope of the claims. One of ordinary skill in the art would recognize many variations, alternatives, and modifications. The turning-off controller 940 includes a sampling unit 1210, a voltage-controlled current source 1230, a capacitor 1240, switches 1250 and 1260, and a comparator 1220. For example, the sampling unit 1210 is implemented using one or more software components, one or more hardware components, and/or one or more combinations of software and hardware components, and/or the sampling unit 1210 is implemented in one or more circuits, such as one or more analog circuits and/or one or more digital circuits. Although the above has been shown using a selected group of components for the turning-off controller, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the sampling unit 1210 receives the voltage 361 and generates a sampled voltage 1211 and a sampled voltage 1213 based at least in part on the voltage 361. For example, the sampling unit 1210 samples the voltage 361 when the transistor 320 is turned on and the transistor 330 is turned off, and in response generates the sampled voltage 1211 (e.g., V5) to represent the voltage 361 when the transistor 320 is turned on and the transistor 330 is turned off. As an example, the sampling unit 1210 samples the voltage 361 when the transistor 320 is turned off and the transistor 330 is turned on, and in response generates the sampled voltage 1213 (e.g., V6) to represent the voltage 361 when the transistor 320 is turned off and the transistor 330 is turned on.

In certain examples, the sampled voltage 1211 (e.g., V5) is directly proportional to the voltage 361 when the transistor 320 is turned on and the transistor 330 is turned off. For example, when the transistor 320 is turned on and the transistor 330 is turned off, the voltage 361 is equal to $V_{in}-N\times V_o$, wherein $V_{in}$ represents the voltage 351. $V_o$ represents the output voltage 392, and N represents the turns ratio that is equal to the ratio of the number of turns in the primary winding 310 to the number of turns in the secondary winding 312. As an example, the sampled voltage 1211 (e.g., V5) is equal to $m_3 \times (V_{in} - N \times V_o)$, wherein $m_3$ is a predetermined constant. $V_{in}$ represents the voltage 351, $V_o$ represents the output voltage 392, and N represents the turns ratio that is equal to the ratio of the number of turns in the primary winding 310 to the number of turns in the secondary winding 312.

In some examples, the sampled voltage 1213 (e.g., V6) is directly proportional to the voltage 361 when the transistor 320 is turned off and the transistor 330 is turned on. For example, when the transistor 320 is turned off and the transistor 330 is turned on, the voltage 361 is equal to $N \times V_o$, wherein $V_o$ represents the output voltage 392 and N represents the turns ratio that is equal to the ratio of the number of turns in the primary winding 310 to the number of turns in the secondary winding 312. As an example, the sampled voltage 1213 (e.g., V6) is equal to $m_4 \times N \times V_o$, wherein $m_4$ is a predetermined constant. $V_o$ represents the output voltage 392, and N represents the turns ratio that is equal to the ratio of the number of turns in the primary winding 310 to the number of turns in the secondary winding 312.

According to certain embodiments, the voltage-controlled current source 1230) receives the sampled voltage 1213 (e.g., V6) and generates a current 1231 based at least in part on the sampled voltage 1213 (e.g., V6). For example, the current 1231 (e.g., 14) is directly proportional to the sampled voltage 1213 (e.g., V6). As an example, the current 1231 is determined as follows:

$$I_4 = k \times V_6 \qquad \text{(Equation 18)}$$

where $I_4$ represents the current 1231, and V6 represents the sampled voltage 1213. Additionally, k is a predetermined constant.

In some embodiments, the switch 1250 receives a control signal 1291. For example, if the control signal 1291 (e.g., ZVS_on) is at a logic high level, the switch 1250 is closed. As an example, if the control signal 1291 (e.g., ZVS_on) is at a logic low level, the switch 1250 is open. In certain examples, in response to the mode and/or frequency control signal 931 (e.g., DCM_on) changing from the logic low level to the logic high level, the control signal 1291 (e.g., ZVS_on) changes from the logic low level to the logic high level and the switch 1250 becomes closed. In some examples, after the control signal 1291 (e.g., ZVS_on) changes from the logic low level to the logic high level, the control signal 1291 (e.g., ZVS_on) remains at the logic high level until the turning-off control signal 943 (e.g., ZVS_off) changes from the logic low level to the logic high level. For example, in response to the turning-off control signal 943 (e.g., ZVS_off) changing from the logic low level to the logic high level, the control signal 1291 (e.g., ZVS_on) changes from the logic high level to the logic low level. As an example, at the same time, the turning-off control signal 943 (e.g., ZVS_off) changes from the logic low level to the logic high level and the control signal 1291 (e.g., ZVS_on) changes from the logic high level to the logic low level. In certain embodiments, the switch 1260 receives the turning-off control signal 943 (e.g., ZVS_off). For example, if the turning-off control signal 943 (e.g., ZVS_off) is at a logic high level, the switch 1260 is closed. As an example, if the turning-off control signal 943 (e.g., ZVS_off) is at a logic low level, the switch 1260 is open.

In certain embodiments, the capacitor 1240 includes a capacitor terminal 1242 that is biased to a ground voltage (e.g., 0 volt), and the capacitor 1240 also includes a capacitor terminal 1244 that is biased to a voltage 1245. For example, when the switch 1250 is closed and the switch 1260 is open, the capacitor 1240 is charged by the current 1231 and the voltage 1245 increases with time, until the switch 1260 becomes closed. As an example, when the switch 1260 becomes closed, the switch 1250 becomes open. In certain examples, when the switch 1260 is closed and the switch 1250 is open, the capacitor 1240 is discharged and the voltage 1245 drops to the ground voltage (e.g., 0 volt). For example, at the same time, the switch 1260 becomes closed in response to the turning-off control signal 943 (e.g., ZVS_off) changing from the logic low level to the logic high level, and the switch 1250 becomes open in response to the control signal 1291 (e.g., ZVS_on) changing from the logic high level to the logic low level.

According to some embodiments, as shown in FIG. 5, at time $t_{53}$, the capacitor 1240 starts being charged by the current 1231 and the voltage 1245 starts increasing with time. For example, from time $t_{53}$ to time $t_{54}$, the capacitor 1240 remains being charged by the current 1231 and the voltage 1245 remains increasing with time. As an example, at time $t_{54}$, the capacitor 1240 is discharged and the voltage 1245 drops to the ground voltage (e.g., 0 volts).

According to certain embodiments, as shown in FIG. 6, at time $t_{64}$, the capacitor 1240 starts being charged by the current 1231 and the voltage 1245 starts increasing with time. For example, from time $t_{64}$ to time $t_{65}$, the capacitor 1240 remains being charged by the current 1231 and the voltage 1245 remains increasing with time. As an example, at time $t_{55}$, the capacitor 1240 is discharged and the voltage 1245 drops to the ground voltage (e.g., 0 volts).

In some embodiments, the comparator 1220 receives the sampled voltage 1211 (e.g., V5) and the voltage 1245 (e.g., $V_m$) and generates the turning-off control signal 943 (e.g., ZVS_off) based at least in part on the sampled voltage 1211 (e.g., V5) and the voltage 1245 (e.g., $V_m$). For example, if the voltage 1245 (e.g., $V_m$) becomes larger than the sampled voltage 1211 (e.g., V5), the turning-off control signal 943 (e.g., ZVS_off) changes from the logic low level to the logic high level. As an example, in response to the turning-off control signal 943 (e.g., ZVS_off) changing from the logic low level to the logic high level, the capacitor 1240 is discharged and the voltage 1245 drops to the ground voltage (e.g., 0 volt), causing the turning-off control signal 943 (e.g., ZVS_off) to change from the logic high level to the logic low level.

Certain embodiments of the present disclosure provide an asymmetrical half-bridge fly back switch-mode power converter (e.g., the asymmetrical half-bridge fly back switch-mode power converter 300) that is configured to detect the end of a demagnetization process. In some examples, if the asymmetrical half-bridge fly back switch-mode power converter operates in the discontinuous conduction mode (DCM), in response to detecting the end of the demagnetization process, a transistor (e.g., the transistor 330) is turned off at the end of the demagnetization process (e.g., at time $t_{63}$) in order to improve the efficiency of the asymmetrical half-bridge fly back switch-mode power converter (e.g., the asymmetrical half-bridge fly back switch-mode power converter 300). In certain examples, if the asymmetrical half-bridge fly back switch-mode power converter operates in the critical conduction mode (CRM), in response to detecting the end of the demagnetization process (e.g., at time $t_{53}$), a transistor (e.g., the transistor 330) is turned off at a time (e.g., at time $t_{54}$) after the end of the demagnetization process.

According to certain embodiments, a controller for a power converter includes: a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time; a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage; wherein the demagnetization detector is further configured to: detect an end of a demagnetization process based at least in part on the first voltage and the second voltage; and in response to detecting the end of the demagnetization process, change the demagnetization signal from a first logic level to a second logic level; wherein the second drive signal generator is further configured to: in response to the demagnetization signal changing from the first logic level to the second logic level, change the second drive signal to turn off the second transistor at a fourth time, the fourth time being later than the third time and being earlier than the second time. For example, the controller is implemented according to at least FIG. 4A, FIG. 4B, and/or FIG. 6.

As an example, the first logic level is a logic low level; and the second logic level is a logic high level. For example, the second drive signal generator is further configured to change the second drive signal to turn on the second transistor at a fifth time, the fifth time being later than the fourth time and being earlier than the second time. As an example, the controller further includes: a first controller configured to generate a first control signal and output the first control signal to the second drive signal generator; wherein the second drive signal generator is further configured to: in response to the first control signal changing from the first logic level to the second logic level, change the second drive signal to turn off the second transistor at a sixth time, the sixth time being later than the fifth time and being earlier than the second time.

For example, the demagnetization detector is further configured to generate the demagnetization signal based at least in part on the first voltage, the second voltage and an adjustment signal and output the demagnetization signal to the second drive signal generator. As an example, the demagnetization detector is further configured to: detect the end of the demagnetization process based at least in part on the first voltage, the second voltage and the adjustment signal; and in response to detecting the end of the demagnetization process, change the demagnetization signal from the first logic level to the second logic level.

For example, the demagnetization detector includes: a sampling unit configured to receive the first voltage and generate a sampled voltage based at least in part on the first voltage; a voltage-controlled current source configured to receive the sampled voltage and the adjustment signal and generate a current based at least in part on the sampled voltage and the adjustment signal; a first switch coupled to the voltage-controlled current source; a capacitor coupled to the first switch and configured to generate a third voltage; a comparator configured to receive the second voltage and the third voltage and generate the demagnetization signal based at least in part on the second voltage and the third voltage; and a second switch coupled to the first switch and the capacitor.

As an example, the sampling unit is further configured to generate the sampled voltage to represent the first voltage during the demagnetization process. For example, the voltage-controlled current source is further configured to: receive the sampled voltage and the adjustment signal; determine a conversion value based at least in part on the adjustment signal; and generate the current that is equal to the sampled voltage multiplied by the conversion value. As an example, the voltage-controlled current source is further configured to change the conversion value in response to a change in the adjustment signal. For example, when the first switch is closed and the second switch is open, the capacitor is configured to be charged by the current to increase the third voltage. As an example, the comparator is further configured to: in response to the third voltage becoming larger than the second voltage, change the demagnetization signal from the first logic level to the second logic level to turn off the second transistor at the fourth time. For example, when the second switch is closed and the first switch is open, the capacitor is configured to be discharged to decrease the third voltage.

As an example, the demagnetization detector includes: a sampling unit configured to receive the first voltage and generate a first sampled voltage and a second sampled voltage based at least in part on the first voltage; a first voltage-controlled current source configured to receive the first sampled voltage and generate a first current based at least in part on the first sampled voltage; a first switch coupled to the first voltage-controlled current source; a first capacitor coupled to the first switch and configured to generate a third voltage; a computation unit configured to receive the second voltage and the third voltage and generate a conversion signal based at least in part on the second voltage and the third voltage; and a second switch coupled to the first switch and the first capacitor. For example, the demagnetization detector further includes: a second voltage-controlled current source configured to receive the second sampled voltage and the conversion signal and generate a second current based at least in part on the second sampled voltage and the conversion signal; a third switch coupled to the second voltage-controlled current source; a second capacitor coupled to the third switch and configured to generate a fourth voltage; a comparator configured to receive the second voltage and the fourth voltage and generate the demagnetization signal based at least in part on the second voltage and the fourth voltage; and a fourth switch coupled to the third switch and the second capacitor.

As an example, the sampling unit is further configured to: generate the first sampled voltage to represent the first voltage when the first transistor is turned on; and generate the second sampled voltage to represent the first voltage during the demagnetization process. For example, the first voltage-controlled current source is further configured to: receive the first sampled voltage; and generate the first current that is equal to the first sampled voltage multiplied by a first predetermined constant. As an example, when the first switch is closed and the second switch is open, the first capacitor is configured to be charged by the first current to increase the third voltage. For example, the computation unit is further configured to: receive the second voltage and the third voltage; and generate the conversion signal with a magnitude that is equal to a second predetermined constant multiplied by a ratio of the second voltage to the third voltage. As an example, when the second switch is closed and the first switch is open, the first capacitor is configured to be discharged to decrease the third voltage. For example, the second voltage-controlled current source is further configured to: receive the second sampled voltage and the conversion signal; and generate the second current that is equal to the second sampled voltage multiplied by the magnitude of the conversion signal. As an example, when the third switch is closed and the fourth switch is open, the second capacitor is configured to be charged by the second current to increase the fourth voltage. For example, the comparator is further configured to: in response to the fourth voltage becoming larger than the second voltage, change the demagnetization signal from the first logic level to the second logic level to turn off the second transistor at the fourth time. As an example, when the fourth switch is closed and the third switch is open, the second capacitor is configured to be discharged to decrease the fourth voltage.

According to some embodiments, a controller for a power converter includes: a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time; a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage; wherein the demagnetization detector is further configured to: detect an end of a demagnetization process based at least in part on the first voltage and the second voltage; and in response to detecting the end of the demagnetization process, change the demagnetization signal from a first logic level to a second logic level at a fourth time, the fourth time being later than the third time and being earlier than the second time; wherein the second drive signal generator is further configured to: in response to the demagnetization signal changing from the first logic level to the second logic level at the fourth time, change the second drive signal to turn off the second transistor at a fifth time, the fifth time being later than the fourth time and being earlier than the second time. For example, the controller is implemented according to at least FIG. 4A, FIG. 4B, and/or FIG. 5.

As an example, the first logic level is a logic low level; and the second logic level is a logic high level. For example, the demagnetization detector is further configured to generate the demagnetization signal based at least in part on the first voltage, the second voltage and an adjustment signal and output the demagnetization signal to the second drive signal generator. As an example, the demagnetization detector is further configured to: detect the end of the demagnetization process based at least in part on the first voltage, the second voltage and the adjustment signal; and in response to detecting the end of the demagnetization process, change the demagnetization signal from the first logic level to the second logic level at the fourth time.

According to certain embodiments, a method for a power converter includes: generating a first drive signal to turn off a first transistor at a first time, the first transistor being configured to receive an input voltage and related to a primary winding coupled to an auxiliary winding and a secondary winding, the secondary winding being related to an output voltage; changing the first drive signal to turn on the first transistor at a second time, the second time being later than the first time; generating a second drive signal to turn on a second transistor at a third time, the second transistor being coupled to the first transistor and related to the primary winding, the third time being later than the first time and being earlier than the second time; generating a demagnetization signal based at least in part on a first voltage and a second voltage, the first voltage being related to the auxiliary winding, the second voltage being related to the output voltage; and in response to the demagnetization signal changing from a first logic level to a second logic level, changing the second drive signal to turn off the second transistor at a fourth time, the fourth time being later than the third time and being earlier than the second time; wherein the generating a demagnetization signal based at least in part on a first voltage and a second voltage includes: detecting an end of a demagnetization process based at least in part on the first voltage and the second voltage; and in response to detecting the end of the demagnetization process, changing the demagnetization signal from the first logic level to the second logic level. For example, the method is implemented according to at least FIG. 4A, FIG. 4B, and/or FIG. 6.

As an example, the first logic level is a logic low level; and the second logic level is a logic high level. For example, the method further includes: changing the second drive signal to turn on the second transistor at a fifth time, the fifth time being later than the fourth time and being earlier than the second time. As an example, the method further includes: changing a first control signal from the first logic level to the second logic level; and in response, changing the second drive signal to turn off the second transistor at a sixth time, the sixth time being later than the fifth time and being earlier than the second time. For example, the generating a demagnetization signal based at least in part on a first voltage and a second voltage includes generating the demagnetization signal based at least in part on the first voltage, the second voltage and an adjustment signal. As an example, the generating the demagnetization signal based at least in part on the first voltage, the second voltage and an adjustment signal includes: detecting the end of the demagnetization process based at least in part on the first voltage, the second voltage and the adjustment signal; and in response to detecting the end of the demagnetization process, changing the demagnetization signal from the first logic level to the second logic level.

According to some embodiments, a method for a power converter includes: generating a first drive signal to turn off a first transistor at a first time, the first transistor being configured to receive an input voltage and related to a primary winding coupled to an auxiliary winding and a secondary winding, the secondary winding being related to an output voltage; changing the first drive signal to turn on the first transistor at a second time, the second time being later than the first time; generating a second drive signal to turn on a second transistor at a third time, the second transistor being coupled to the first transistor and related to the primary winding, the third time being later than the first time and being earlier than the second time; generating a demagnetization signal based at least in part on a first voltage and a second voltage, the first voltage being related to the auxiliary winding, the second voltage being related to the output voltage; and in response to the demagnetization signal changing from a first logic level to a second logic level at a fourth time, changing the second drive signal to turn off the second transistor at a fifth time, the fourth time being later than the third time and being earlier than the second time, the fifth time being later than the fourth time and being earlier than the second time; wherein the generating a demagnetization signal based at least in part on a first voltage and a second voltage includes: detecting an end of a demagnetization process based at least in part on the first voltage and the second voltage; and in response to detecting the end of the demagnetization process, changing the demagnetization signal from the first logic level to the second logic level at the fourth time. As an example, the first logic level is a logic low level; and the second logic level is a logic high level. For example, the generating a demagnetization signal based at least in part on a first voltage and a second voltage includes generating the demagnetization signal based at least in part on the first voltage, the second voltage and an adjustment signal. As an example, the generating the demagnetization signal based at least in part on the first voltage, the second voltage and an adjustment signal includes: detecting the end of the demagnetization process based at least in part on the first voltage, the second voltage and the adjustment signal; and in response to detecting the end of the demagnetization process, changing the demagnetization signal from the first logic level to the second logic level at the fourth time. For example, the method is implemented according to at least FIG. 4A, FIG. 4B, and/or FIG. 5.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, various embodiments and/or examples of the present disclosure can be combined.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a power converter, the controller comprising:

a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time;

a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage;

wherein the demagnetization detector is further configured to:

detect an end of a demagnetization process based at least in part on the first voltage and the second voltage; and in response to detecting the end of the demagnetization process, change the demagnetization signal from a first logic level to a second logic level;

wherein the second drive signal generator is further configured to:

in response to the demagnetization signal changing from the first logic level to the second logic level, change the second drive signal to turn off the second transistor at a fourth time, the fourth time being later than the third time and being earlier than the second time.

2. The controller of claim 1 wherein:

the first logic level is a logic low level; and the second logic level is a logic high level.

3. The controller of claim 1 wherein the second drive signal generator is further configured to change the second drive signal to turn on the second transistor at a fifth time, the fifth time being later than the fourth time and being earlier than the second time.

4. The controller of claim 3, and further comprising:

a first controller configured to generate a first control signal and output the first control signal to the second drive signal generator;

wherein the second drive signal generator is further configured to:

in response to the first control signal changing from the first logic level to the second logic level, change the second drive signal to turn off the second transistor at a sixth time, the sixth time being later than the fifth time and being earlier than the second time.

5. The controller of claim 1 wherein the demagnetization detector is further configured to generate the demagnetization signal based at least in part on the first voltage, the second voltage and an adjustment signal and output the demagnetization signal to the second drive signal generator.

6. The controller of claim 5 wherein the demagnetization detector is further configured to:

detect the end of the demagnetization process based at least in part on the first voltage, the second voltage and the adjustment signal; and in response to detecting the end of the demagnetization process, change the demagnetization signal from the first logic level to the second logic level.

7. The controller of claim 5 wherein the demagnetization detector includes:

a sampling unit configured to receive the first voltage and generate a sampled voltage based at least in part on the first voltage;

a voltage-controlled current source configured to receive the sampled voltage and the adjustment signal and generate a current based at least in part on the sampled voltage and the adjustment signal;

a first switch coupled to the voltage-controlled current source;

a capacitor coupled to the first switch and configured to generate a third voltage;

a comparator configured to receive the second voltage and the third voltage and generate the demagnetization signal based at least in part on the second voltage and the third voltage; and a second switch coupled to the first switch and the capacitor.

8. The controller of claim 7 wherein the sampling unit is further configured to generate the sampled voltage to represent the first voltage during the demagnetization process.

9. The controller of claim 8 wherein the voltage-controlled current source is further configured to:

receive the sampled voltage and the adjustment signal;

determine a conversion value based at least in part on the adjustment signal; and generate the current that is equal to the sampled voltage multiplied by the conversion value.

10. The controller of claim 9 wherein the voltage-controlled current source is further configured to change the conversion value in response to a change in the adjustment signal.

11. The controller of claim 9 wherein:

when the first switch is closed and the second switch is open, the capacitor is configured to be charged by the current to increase the third voltage.

12. The controller of claim 11 wherein the comparator is further configured to:

in response to the third voltage becoming larger than the second voltage, change the demagnetization signal from the first logic level to the second logic level to turn off the second transistor at the fourth time.

13. The controller of claim 12 wherein:

when the second switch is closed and the first switch is open, the capacitor is configured to be discharged to decrease the third voltage.

14. The controller of claim 1 wherein the demagnetization detector includes:

a sampling unit configured to receive the first voltage and generate a first sampled voltage and a second sampled voltage based at least in part on the first voltage;

a first voltage-controlled current source configured to receive the first sampled voltage and generate a first current based at least in part on the first sampled voltage;

a first switch coupled to the first voltage-controlled current source;

a first capacitor coupled to the first switch and configured to generate a third voltage;

a computation unit configured to receive the second voltage and the third voltage and generate a conversion signal based at least in part on the second voltage and the third voltage; and a second switch coupled to the first switch and the first capacitor.

15. The controller of claim 14 wherein the demagnetization detector further includes:

a second voltage-controlled current source configured to receive the second sampled voltage and the conversion signal and generate a second current based at least in part on the second sampled voltage and the conversion signal;

a third switch coupled to the second voltage-controlled current source;

a second capacitor coupled to the third switch and configured to generate a fourth voltage;

a comparator configured to receive the second voltage and the fourth voltage and generate the demagnetization signal based at least in part on the second voltage and the fourth voltage; and a fourth switch coupled to the third switch and the second capacitor.

16. The controller of claim 15 wherein the sampling unit is further configured to:

generate the first sampled voltage to represent the first voltage when the first transistor is turned on; and generate the second sampled voltage to represent the first voltage during the demagnetization process.

17. The controller of claim 16 wherein the first voltage-controlled current source is further configured to:

receive the first sampled voltage; and generate the first current that is equal to the first sampled voltage multiplied by a first predetermined constant.

18. The controller of claim 15 wherein the second voltage-controlled current source is further configured to:

receive the second sampled voltage and the conversion signal; and generate the second current that is equal to the second sampled voltage multiplied by the magnitude of the conversion signal.

19. The controller of claim 15 wherein:

when the third switch is closed and the fourth switch is open, the second capacitor is configured to be charged by the second current to increase the fourth voltage.

20. The controller of claim 19 wherein the comparator is further configured to:

in response to the fourth voltage becoming larger than the second voltage, change the demagnetization signal from the first logic level to the second logic level to turn off the second transistor at the fourth time.

21. The controller of claim 15 wherein:

when the fourth switch is closed and the third switch is open, the second capacitor is configured to be discharged to decrease the fourth voltage.

22. The controller of claim 14 wherein:

when the first switch is closed and the second switch is open, the first capacitor is configured to be charged by the first current to increase the third voltage.

23. The controller of claim 22 wherein the computation unit is further configured to:

receive the second voltage and the third voltage; and generate the conversion signal with a magnitude that is equal to a second predetermined constant multiplied by a ratio of the second voltage to the third voltage.

24. The controller of claim 14 wherein:

when the second switch is closed and the first switch is open, the first capacitor is configured to be discharged to decrease the third voltage.

25. A controller for a power converter, the controller comprising:

a first drive signal generator configured to generate a first drive signal to turn off a first transistor at a first time and turn on the first transistor at a second time, the first transistor being configured to receive an input voltage and related to a primary winding coupled to an auxiliary winding and a secondary winding, the secondary winding being related to an output voltage, the second time being later than the first time;

a second drive signal generator configured to generate a second drive signal to turn on a second transistor at a third time, the second transistor being coupled to the first transistor and related to the primary winding, the third time being later than the first time and being earlier than the second time; and a demagnetization detector configured to generate a demagnetization signal based at least in part on a first voltage and a second voltage and output the demagnetization signal to the second drive signal generator, the first voltage being related to the auxiliary winding, the second voltage being related to the output voltage;

wherein the demagnetization detector is further configured to:

detect an end of a demagnetization process based at least in part on the first voltage and the second voltage; and in response to detecting the end of the demagnetization process, change the demagnetization signal from a first logic level to a second logic level at a fourth time, the fourth time being later than the third time and being earlier than the second time;

wherein the second drive signal generator is further configured to:

in response to the demagnetization signal changing from the first logic level to the second logic level at the fourth time, change the second drive signal to turn off the second transistor at a fifth time, the fifth time being later than the fourth time and being earlier than the second time.

26. The controller of claim 25 wherein:

the first logic level is a logic low level; and the second logic level is a logic high level.

27. The controller of claim 25 wherein the demagnetization detector is further configured to generate the demagnetization signal based at least in part on the first voltage, the second voltage and an adjustment signal and output the demagnetization signal to the second drive signal generator.

28. The controller of claim 27 wherein the demagnetization detector is further configured to:

detect the end of the demagnetization process based at least in part on the first voltage, the second voltage and the adjustment signal; and in response to detecting the end of the demagnetization process, change the demagnetization signal from the first logic level to the second logic level at the fourth time.

29. A method for a power converter, the method comprising:

generating a first drive signal to turn off a first transistor at a first time, the first transistor being configured to receive an input voltage and related to a primary winding coupled to an auxiliary winding and a secondary winding, the secondary winding being related to an output voltage;

changing the first drive signal to turn on the first transistor at a second time, the second time being later than the first time;

generating a second drive signal to turn on a second transistor at a third time, the second transistor being coupled to the first transistor and related to the primary winding, the third time being later than the first time and being earlier than the second time;

generating a demagnetization signal based at least in part on a first voltage and a second voltage, the first voltage being related to the auxiliary winding, the second voltage being related to the output voltage; and in response to the demagnetization signal changing from a first logic level to a second logic level, changing the second drive signal to turn off the second transistor at a fourth time, the fourth time being later than the third time and being earlier than the second time;

wherein the generating a demagnetization signal based at least in part on a first voltage and a second voltage includes:

detecting an end of a demagnetization process based at least in part on the first voltage and the second voltage; and in response to detecting the end of the demagnetization process, changing the demagnetization signal from the first logic level to the second logic level.

30. The method of claim 29 wherein:

the first logic level is a logic low level; and the second logic level is a logic high level.

31. The method of claim 29, and further comprising:

changing the second drive signal to turn on the second transistor at a fifth time, the fifth time being later than the fourth time and being earlier than the second time.

32. The method of claim 31, and further comprising:

changing a first control signal from the first logic level to the second logic level; and in response, changing the second drive signal to turn off the second transistor at a sixth time, the sixth time being later than the fifth time and being earlier than the second time.

33. The method of claim 29 wherein the generating a demagnetization signal based at least in part on a first voltage and a second voltage includes generating the demagnetization signal based at least in part on the first voltage, the second voltage and an adjustment signal.

34. The method of claim 33 wherein the generating the demagnetization signal based at least in part on the first voltage, the second voltage and an adjustment signal includes:

detecting the end of the demagnetization process based at least in part on the first voltage, the second voltage and the adjustment signal; and in response to detecting the end of the demagnetization process, changing the demagnetization signal from the first logic level to the second logic level.

35. A method for a power converter, the method comprising:

generating a first drive signal to turn off a first transistor at a first time, the first transistor being configured to receive an input voltage and related to a primary winding coupled to an auxiliary winding and a secondary winding, the secondary winding being related to an output voltage;

changing the first drive signal to turn on the first transistor at a second time, the second time being later than the first time;

generating a second drive signal to turn on a second transistor at a third time, the second transistor being coupled to the first transistor and related to the primary winding, the third time being later than the first time and being earlier than the second time;

generating a demagnetization signal based at least in part on a first voltage and a second voltage, the first voltage being related to the auxiliary winding, the second voltage being related to the output voltage; and in response to the demagnetization signal changing from a first logic level to a second logic level at a fourth time, changing the second drive signal to turn off the second transistor at a fifth time, the fourth time being later than the third time and being earlier than the second time, the fifth time being later than the fourth time and being earlier than the second time;

wherein the generating a demagnetization signal based at least in part on a first voltage and a second voltage includes:

detecting an end of a demagnetization process based at least in part on the first voltage and the second voltage; and in response to detecting the end of the demagnetization process, changing the demagnetization signal from the first logic level to the second logic level at the fourth time.

36. The method of claim 35 wherein:

the first logic level is a logic low level; and the second logic level is a logic high level.

37. The method of claim 35 wherein the generating a demagnetization signal based at least in part on a first voltage and a second voltage includes generating the demagnetization signal based at least in part on the first voltage, the second voltage and an adjustment signal.

38. The method of claim 37 wherein the generating the demagnetization signal based at least in part on the first voltage, the second voltage and an adjustment signal includes:

detecting the end of the demagnetization process based at least in part on the first voltage, the second voltage and the adjustment signal; and in response to detecting the end of the demagnetization process, changing the demagnetization signal from the first logic level to the second logic level at the fourth time.

\*  \*  \*  \*  \*